US006631276B1

(12) United States Patent
Yamaguchi et al.

(10) Patent No.: US 6,631,276 B1
(45) Date of Patent: Oct. 7, 2003

(54) BASE UNIT OF RADIO TERMINAL

(75) Inventors: Takashi Yamaguchi, Fukuoka (JP); Hideyuki Furukawa, Fukuoka (JP); Osamu Nakashima, Fukuoka (JP); Naoki Koga, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 478 days.

(21) Appl. No.: 09/644,552

(22) Filed: Aug. 24, 2000

(51) Int. Cl.[7] .............................. H04B 1/38; H04B 1/00

(52) U.S. Cl. ................. 455/561; 455/550.1; 455/575.1; 455/347

(58) Field of Search ................................ 455/561, 550, 455/573, 556, 557, 575, 558, 566, 127, 344, 345, 347; 379/93.05, 38, 93.01, 93.09, 428.03, 428.04

(56) References Cited

U.S. PATENT DOCUMENTS

| | | | | |
|---|---|---|---|---|
| 5,628,055 A | * | 5/1997 | Stein | 455/575 |
| 5,809,115 A | * | 9/1998 | Inkinen | 379/93.05 |
| 5,873,045 A | * | 2/1999 | Lee et al. | 455/550 |
| 6,029,072 A | * | 2/2000 | Barber | 455/557 |
| 6,119,179 A | * | 9/2000 | Whitridge et al. | 710/72 |
| 6,188,917 B1 | * | 2/2001 | Laureanti | 455/573 |
| 6,397,079 B1 | * | 5/2002 | Shimoda et al. | 455/557 |
| 6,516,202 B1 | * | 2/2003 | Hawkins et al. | 455/556 |

FOREIGN PATENT DOCUMENTS

| | | | |
|---|---|---|---|
| WO | WO 9858454 A2 * | 12/1998 | H04B/1/38 |

* cited by examiner

*Primary Examiner*—William Trost
*Assistant Examiner*—Andrew Harry
(74) *Attorney, Agent, or Firm*—Wenderoth, Lind & Ponack, L.L.P.

(57) ABSTRACT

A base unit accommodates a radio terminal for making radio communications. This base unit has a recess for accommodating part of the radio terminal formed at least in two mutually orthogonal planes of the base unit body. An opening is formed at the inner side of the recess. Inside the base unit, a connector electrically connects and fixes the radio terminal. A rear part of the radio terminal is inserted through the opening. The base unit includes a lid for shielding the entire recess. The base unit body may include an external antenna connected to a cable having a terminal for connecting with an external antenna terminal provided in the radio terminal. This terminal may be disposed at a position corresponding to the external antenna terminal of the radio terminal of the lid. The base unit design is improved, invasion of foreign matter is prevented, and the radio reaching distance and directivity of the base unit are enhanced.

35 Claims, 28 Drawing Sheets

BASE UNIT OF RADIO TERMINAL

FIELD OF THE INVENTION

The present invention relates to a base unit of a radio terminal for making radio communications with other radio terminals by making use of a radio function of this radio terminal, and is more particularly applied to a network connection appliance having radio terminals existing in a household or a small office.

BACKGROUND OF THE INVENTION

Recently, along with the spread of the Internet, easy connection devices are demanded. Network connection devices incorporating radio terminals are being launched into the market.

Further, for example, in the so-called cellular phone as a kind of radio terminal, the function is limited, or the performance such as reaching distance or directivity of radio signal is limited because of its extremely small and light-weight structure.

By connecting the cellular phone to a base unit, it is expected to enhance the performance of the cellular phone such as reaching distance or directivity, as well as to add functions not available in the cellular phone. It is also possible to add a function of transferring a signal received by the cellular phone to other devices by wired means.

FIG. 26 is a perspective appearance view of a radio terminal and its base unit in a first prior art arrangement, and FIG. 27 is a longitudinal sectional view of a base unit incorporating the same radio terminal.

A base unit 200 of a conventional radio terminal 1 shown in FIG. 26 and FIG. 27 processes sound, text and graphics data, and communicate with another radio terminal 1 by radio means through the radio terminal 1. A connector 6 is provided at a rear side 1*a* of the radio terminal 1, and an opening 4 for inserting the radio terminal 1 is provided in a front side 2*a* of the base unit 200. A printed circuit board 5 is provided in the base unit 200. The printed circuit board 5 has a connector 7. When the radio terminal 1 is inserted into the opening 4 of the base unit 200, the connector 6 of the radio terminal 1 is electrically connected and fixed to the connector 7.

In this constitution, the radio terminal 1 is inserted into the opening 4 of the base unit 200. A part of the radio terminal 1 projects from the base unit 200, while the connector 6 of the radio terminal 1 is connected and fixed to the connector 7 of the printed circuit board 5 in the base unit 200. In the state of the radio terminal 1 fixed in the base unit 200, the signal data processed in the printed circuit board 5 in the base unit 200 is transmitted through the radio unit and antenna unit in the radio terminal 1. In its reverse path, the signal entering from the radio terminal 1 is processed by the printed circuit board 5 in the base unit 200, thereby being received.

Thus, the conventional radio terminal is connected to the base unit 200, and the fixed radio terminal 1 is used as the radio unit of the base unit 200. Besides, for the ease of attaching and detaching of the radio terminal 1, part of the radio unit projects from the base unit 200. Therefore, the conventional radio terminal is very poor in design. Still worse, since there is a gap between the opening 4 of the base unit 200 and the radio terminal 1, foreign matter is likely to get into the gap. Yet, using the radio unit and antenna unit of the radio terminal 1, it was difficult to enhance the radio reaching distance and directivity.

A second prior art arrangement will now be explained, in which the base unit of the radio terminal is applied in a network connection device. FIG. 28 is a perspective appearance view of a network connection device in the second prior art arrangement. FIG. 29 is a cross sectional view of the conventional network connection device.

The network connection device having the radio terminal in the second prior art arrangement shown in FIG. 28 and FIG. 29 is to exchange data by radio means between radio terminals 1, and to transfer from the base unit 200 to a computer by wired means. A connector 6 is provided at a rear side 1*a* of the radio terminal 1. An opening 4 for inserting the radio terminal 1 is formed at one side 2*a* of the base unit 200. A printed circuit board 5 is held in the main body 2. The printed circuit board 5 has a connector 7. When the radio terminal 1 is inserted into the opening 4 of the base unit 200, the connector 6 of the radio terminal 1 is electrically connected and fixed to the connector 7 of the printed circuit board 5. At this time, an antenna unit 1*b* or radio unit 1*c* of the radio terminal 1 protrudes from the base unit 200, as shown in FIG. 29, so as not to overlap with the printed circuit board 5 in the main body 2 when the radio terminal 1 is inserted and connected to the main body 2.

In this constitution, the antenna unit 1*b* or radio unit 1*c* of the radio terminal 1 maintains the radio reaching distance by suppressing the effects on the antenna unit 1*b* from the conductor of the printed circuit board 5 disposed in the main body 2, thereby eliminating the effects of electric noise, etc. In the state of this radio terminal 1 fixed in the main body 2, the data from a wired interface 12 through a cable is processed in the printed circuit board 5 in the base unit 200, and is transmitted through the radio unit 1*c* in the radio terminal 1. In the case of reception, the signal entering from the radio terminal 1 is processed in the printed circuit board 5 in the base unit 200, and is sent to the wired interface 12.

Thus, in the network connection device in the second prior art arrangement, part of the radio terminal largely protrudes from the base unit so that the antenna unit or radio unit of the radio terminal may not overlap with the printed circuit board in the main body. As a result, this network connection device is very poor in design. Besides, since there is a gap between the opening of the base unit and the radio terminal, foreign matter is likely to get into the gap. Also, when inserting the radio terminal into the base unit opening, there is no guide for inserting, and the insertion is difficult.

SUMMARY OF THE INVENTION

In the light of the problems of the prior art arrangements, it is hence an object of the invention to present a base unit of a radio terminal capable of improving the design, preventing entry of foreign matter, improving the assembly efficiency, and enhancing the radio reaching distance and directivity of the base unit.

To achieve the object, the base unit of the radio terminal of the invention is composed as follows. A recess for accommodating a rear half of a radio terminal is provided over two substantially mutually orthogonal planes of a base unit body. An opening is formed at an inner side of this recess. A printed circuit board provided inside the base unit body has a connector which can be electrically connected to a connector of the radio terminal, disposed at a position for connecting and fixing the radio terminal to the base unit body without projecting from the recess of the base unit body. The base unit body has a lid which shields the entire recess of the base unit body, in a state of the radio terminal inserted into the base unit body by way of the opening in the recess of the base unit body. The base unit body also has an antenna unit having a wired cable provided with a terminal unit at its leading end to be connected electrically with a terminal for an external antenna provided on the front side of the radio terminal. This lid further has a terminal unit of wired cable formed at a position corresponding to the terminal for the external antenna provided at the radio terminal when this lid is shielded.

According to the invention, the base unit can prevent entry of foreign matter from outside. The design of the base unit body is improved. The base unit may be provided with an antenna unit that is of enhanced performance without requiring consideration of its size. The radio reaching distance and directivity can be enhanced without giving any adverse effects on the design of the base unit body. Further, only by the action of shielding the recess of the base unit body by the lid, the antenna unit of the base unit body and the radio terminal which is the radio unit of the base unit body can be connected, and loss of the lid can be prevented.

To solve the aforementioned problems, from another point of view, the base unit of the radio terminal of the invention has a recess capable of accommodating the radio terminal having the antenna unit and radio unit capable of making radio communications of voice, text and graphics data. The recess is formed at least over two substantially mutually orthogonal planes of the base unit body. Further, the base unit comprises:

an opening formed at the inner side of the recess for inserting the radio terminal, and a printed circuit board held in the base unit body and having a connector for connecting with the radio terminal.

Moreover, the base unit is electrically connected and fixed to the radio terminal and connector inserted from the opening through the recess. The printed circuit board is composed so as not to form conductor parts such as power source layer, ground layer, and signal pattern at least in the portion overlapping with the antenna unit of the radio terminal, or to form a notch at least in the portion overlapping with the antenna unit of the radio terminal of the printed circuit board. The recess may also be formed over three planes of the base unit body.

In this constitution, adverse effects on the antenna unit are suppressed, and electric noise to the radio terminal is prevented. When a notch is formed, in addition to this effect, adverse effects of dielectric material forming the printed circuit board may be also eliminated.

Also in this constitution, various interface units for wired communication voice, text and graphics data may be formed at an end facing one end of three nearly orthogonal planes for forming the recess.

As a result, the area of the portion not forming the conductor on the printed circuit board or the notch portion can be reduced, and it is easier to keep space with the wired interface unit. Thus, the layout of the mounted parts on the printed circuit board and the layout of patterns can be achieved efficiently, and the entire substrate may be compact and lowered in cost.

It also comprises an external antenna device that can be connected to the antenna terminal of the radio terminal connected and fixed electrically in the main body. The external antenna is more excellent in reaching distance and directivity than an antenna in the radio terminal limited in space.

It further comprises a cover concealing the radio terminal accommodated in the recess and forming the surface of the appearance of the main body, and a hole penetrating through the back side of the main body is provided in the recess, so that the wiring may be connected by passing the cable connecting from the radio terminal provided in the recess to the antenna device by way of the hole.

In such structure, the design of the base unit body does not depend on the radio terminal. At the same time, the cable wiring design is not sacrificed. Hence, the design can be improved easily. Since the recess of the base unit body is shielded by the cover, invasion of foreign matter into the base unit is prevented, and effects of radiation heat from the radio terminal can be lessened.

Moreover, a rib can be formed as a guide for inserting and connecting the radio terminal into the base unit body, and the working efficiency of inserting and connecting into the connector of the radio terminal can be enhanced.

It is also possible to form a rib surrounding the periphery of the connector in the base unit body for connecting with the radio terminal, in the base unit body, and hence the radiation heat generated when the radio terminal operates stays within a limited space. Therefore, effects of radiation heat on other parts in the base unit body can be lessened, and whether the radio terminal is connected or not, it is possible to prevent invasion of foreign matter into the base unit body from the gap between the opening and the radio terminal.

A groove may also be provided in the main body back side for connecting the cable wired from the main body opening to the end of the main body.

A bump may also be provided for clamping the cable, in part of the groove provided in the main body backside.

An opening for clamping various cables may also be provided at the end of the side having the wired interface of the main body.

In such structures, the cables can be arranged neatly, and it is enhanced in design and easier to install.

DETAILED DESCRIPTION OF THE INVENTION

Embodiments of the invention are described in detail below while referring to the accompanying drawings.

(Embodiment 1)

Figure 1A:
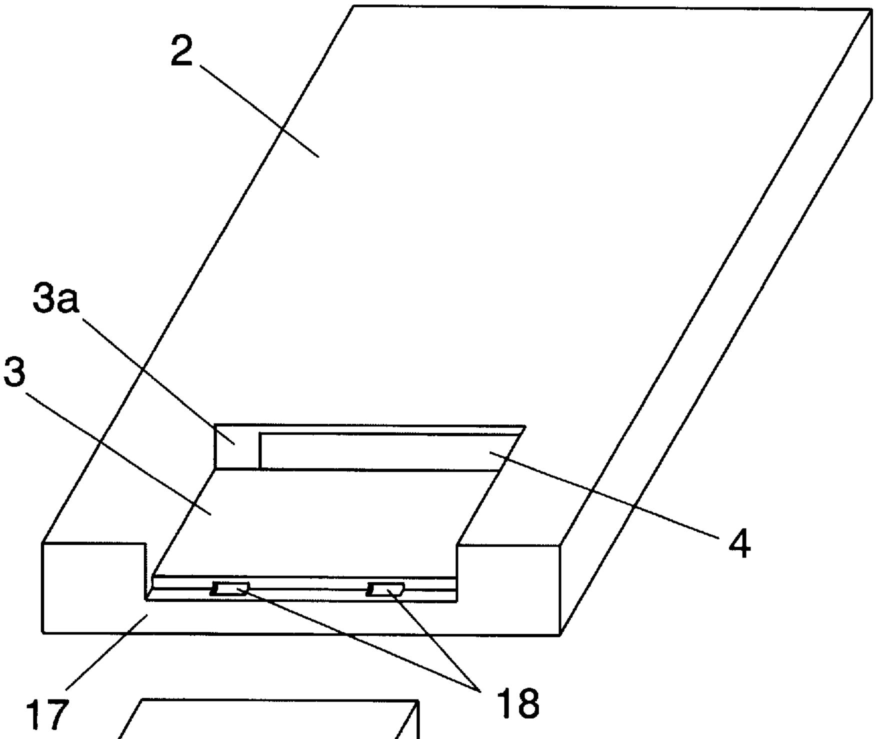
FIGS. 1A and 1B are perspective appearance views of a radio terminal and its base unit in embodiment 1 of the invention.
Figure 1A:
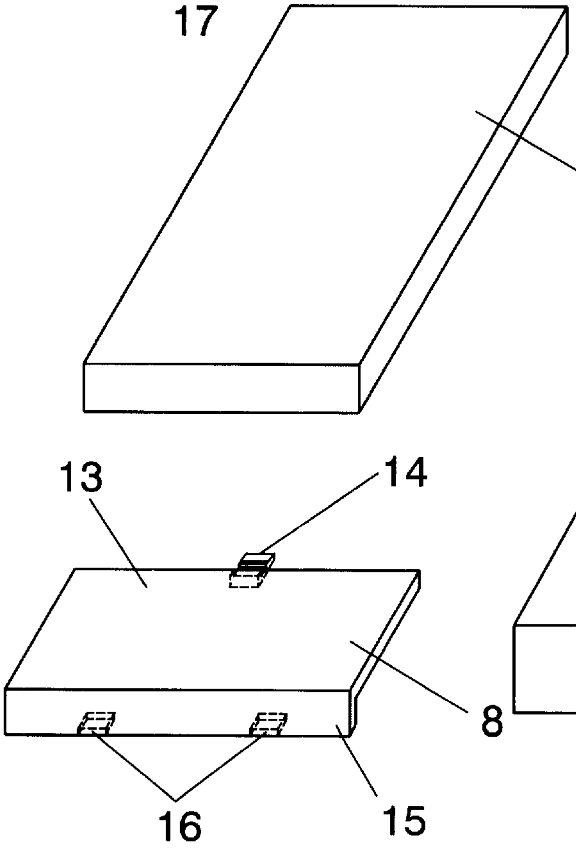
Figure 1B:
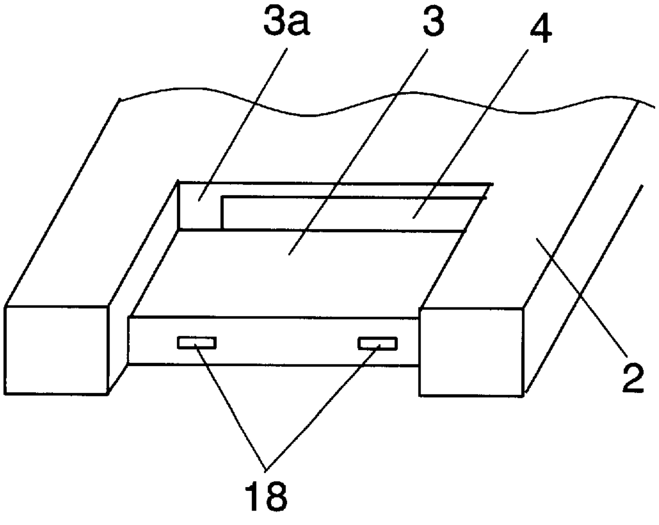
Figure 2:
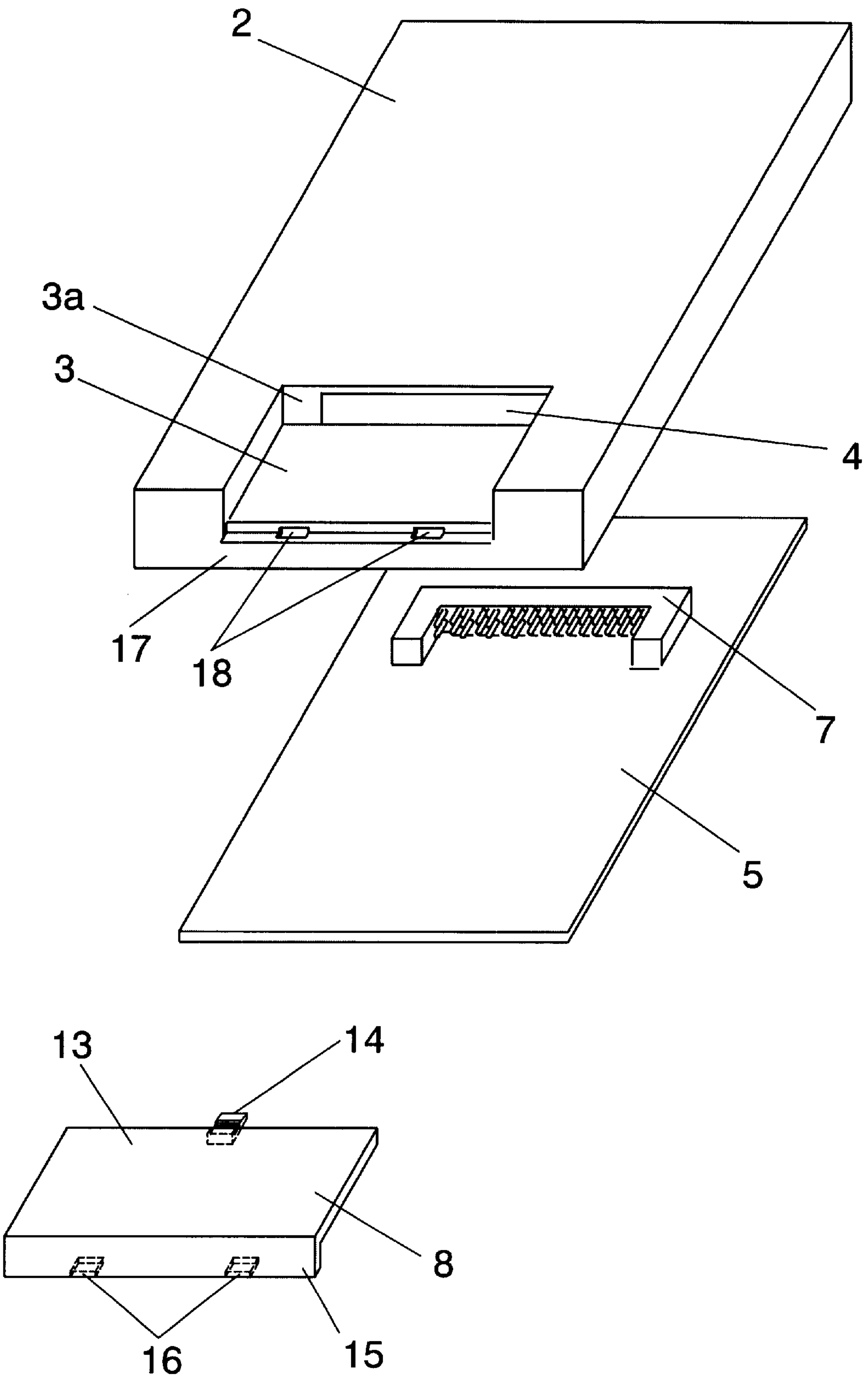
FIG. 2 is a perspective exploded view of the base unit.
Figure 3:
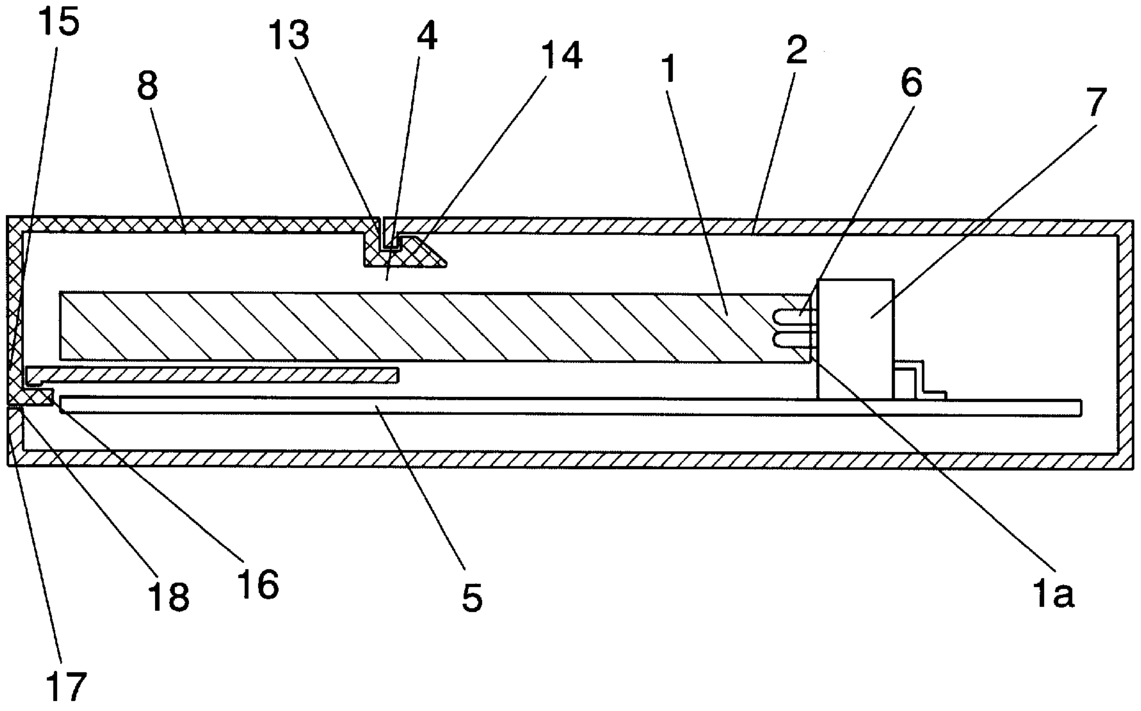
FIG. 3 is a longitudinal sectional view of the base unit accommodating the radio terminal.
Figure 26:
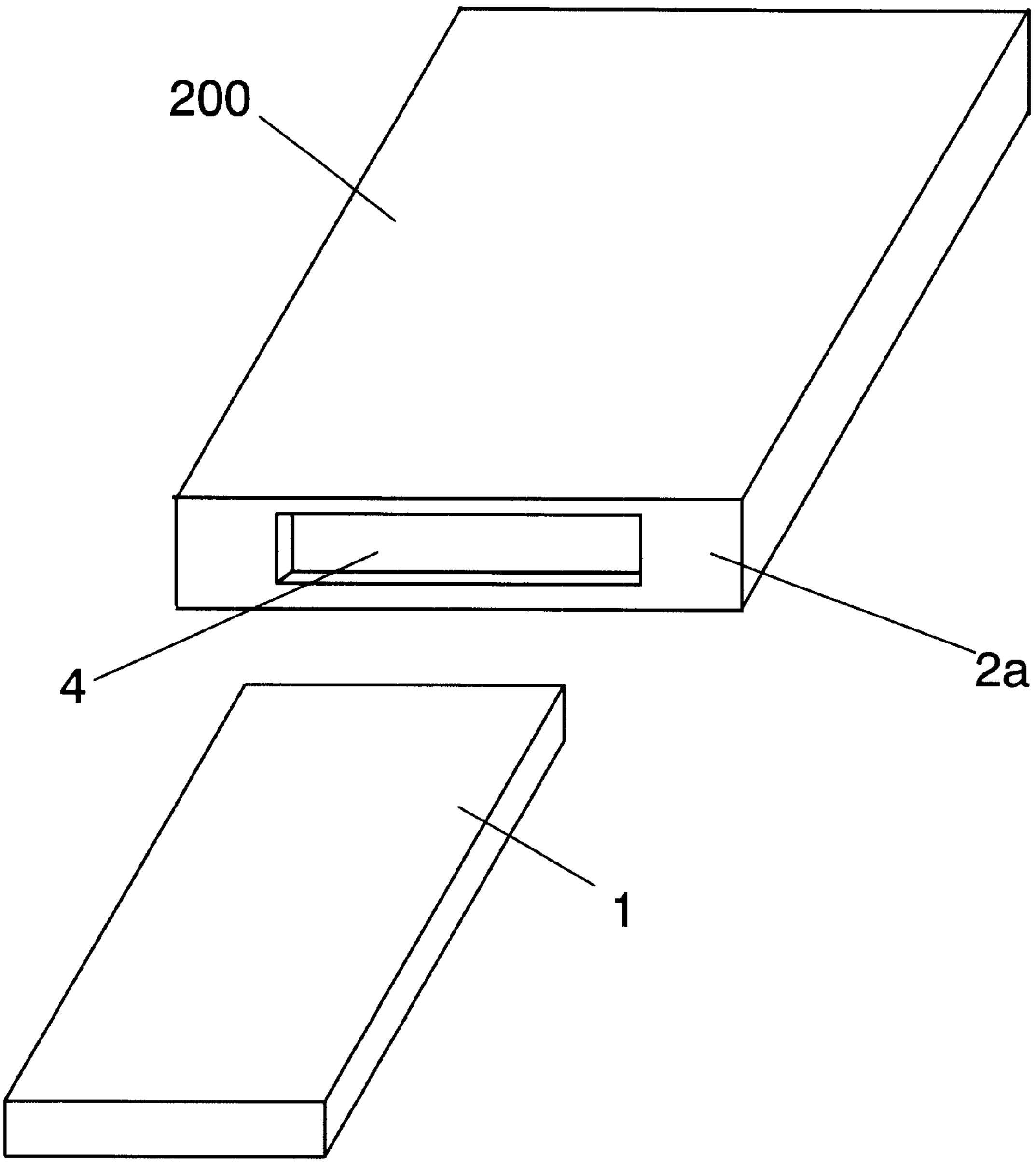
FIG. 26 PRIOR ART
FIG. 26 is a perspective appearance view of a radio terminal and its base unit in a first prior art arrangement.
Figure 27:
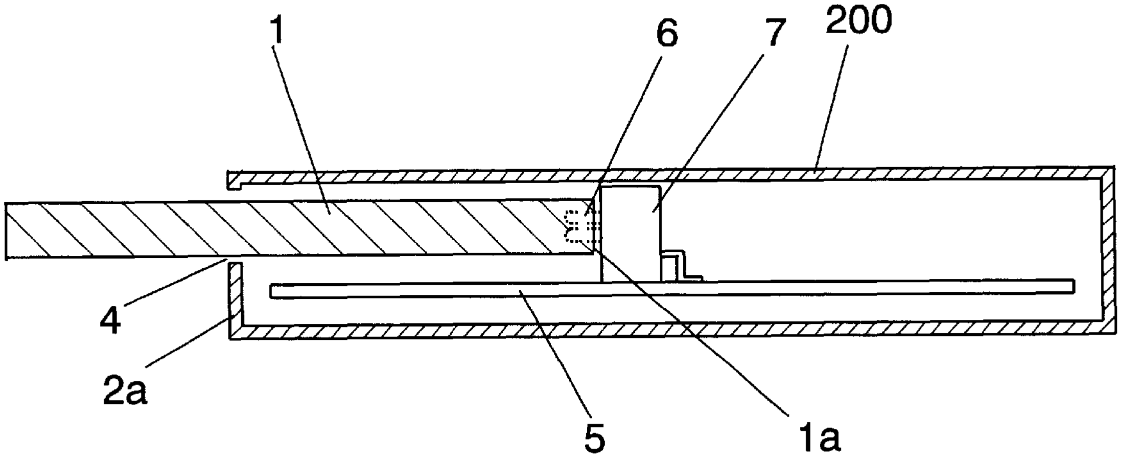
FIG. 27 PRIOR ART
FIG. 27 is a longitudinal sectional view of the base unit incorporating the radio terminal.
Figure 28:
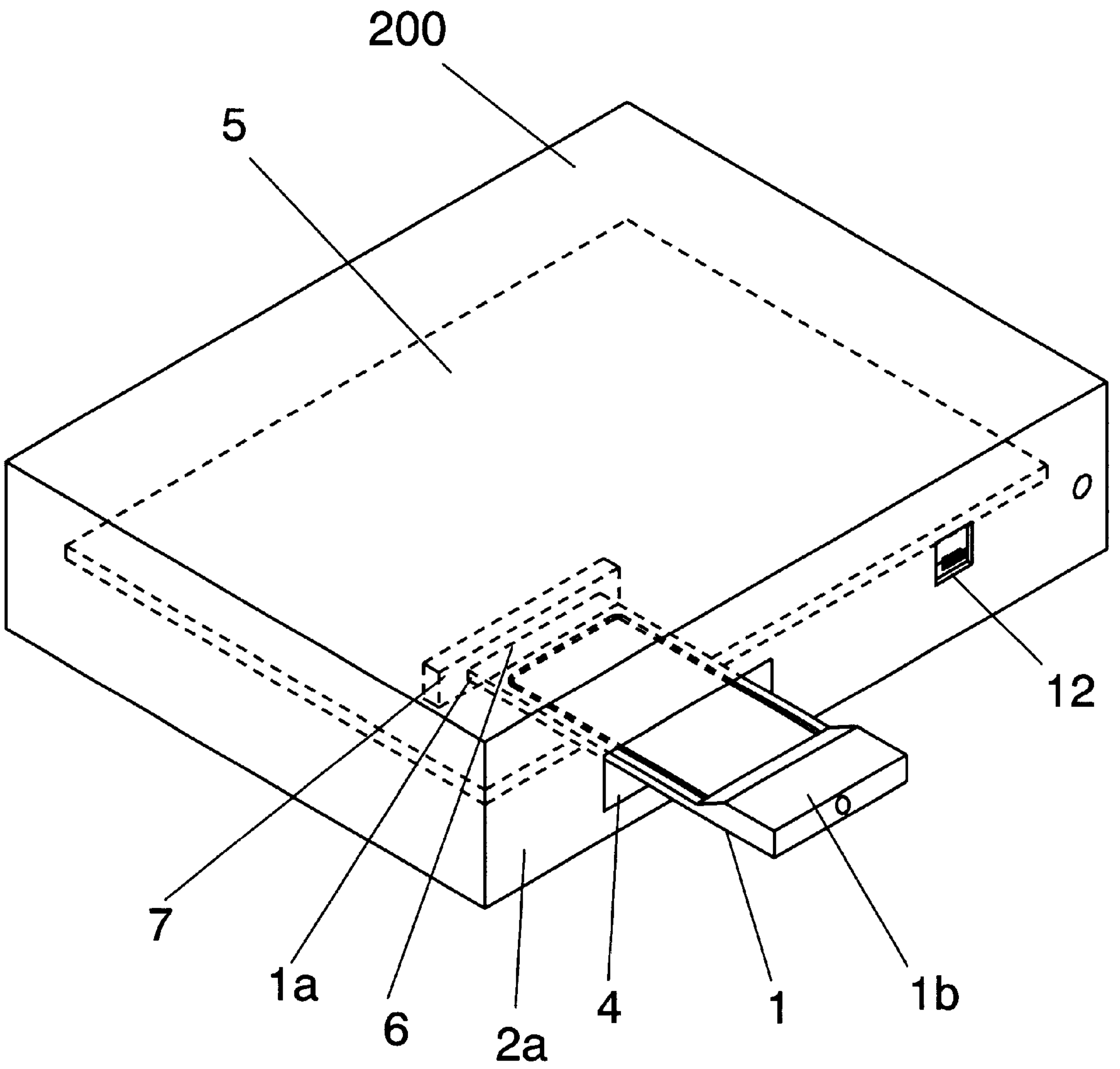
FIG. 28 PRIOR ART
FIG. 28 is a perspective appearance view of a radio terminal and its base unit in a second prior art arrangement.
Figure 29:
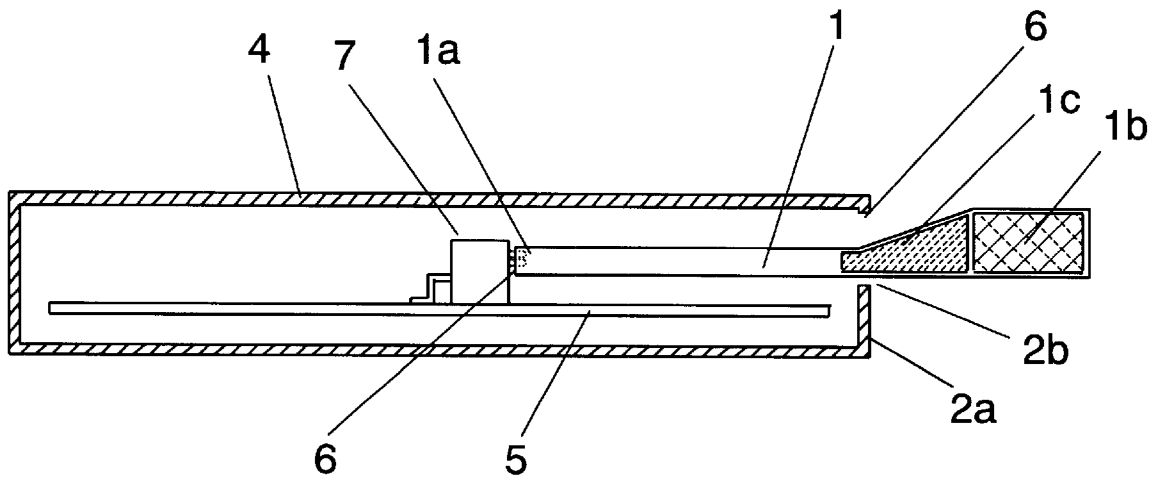
FIG. 29 PRIOR ART
FIG. 29 is a cross sectional view of the radio terminal and its base unit in the second prior art arrangement.

FIGS. 1A and 1B are perspective appearance views of a radio terminal and its base unit in embodiment 1 of the invention, FIG. 2 is a perspective exploded view of the base unit of the radio terminal, and FIG. 3 is a longitudinal sectional view of the base unit accommodating the radio terminal. In the drawings, the same parts as in the prior art FIGS. 26–28 are identified with the same reference numerals.

As shown in FIGS. 1A and 1B, FIG. 2, and FIG. 3, a radio terminal 1 is formed as a flat box.

The appearance of a base unit body 2 is also a flat box, and is large enough to accommodate the radio terminal 1.

The base unit body 2 can make radio communications of sound, text or graphics data with other radio terminals by making use of the radio function, not shown, of the radio terminal 1.

The base unit body 2 has a recess 3 large enough to accommodate about half of the radio terminal 1 in the length direction, over two substantially mutually orthogonal planes of the box (either side part and back part, or side part and front part).

The recess 3 may be formed only in a state allowing the end of the base unit body 2 to be opened so as to accommodate the radio terminal 1, and is not limited to two substantially mutually orthogonal planes of the box. For example, as shown in FIG. 1B, the recess 3 may be formed over three planes including the side part, the back part and a portion of the front part. This is the same in the other embodiments explained below.

The base unit body 2 is not limited to the box shape as shown, but may be designed in a curved shape or the like.

At the inner side 3*a* of the recess 3, there is an opening 4 for inserting a part of the radio terminal 1 into the base unit body 2. The recess 3 is large enough to allow the radio terminal 1 to be pinched by fingers at least when the radio terminal 1 is connected and fixed in the base unit body 2.

Inside of the base unit body 2, a printed circuit board 5 is held. The printed circuit board 5 has a connector 7 for electrically connecting with a connector 6 provided in the rear part 1*a* of the radio terminal 1. The connector 7 is disposed at a position to be connected and fixed to the base unit body 2 without allowing the radio terminal 1 to project from the recess 3 in the base unit body 2. Incidentally, the connector 7 may be used mainly for making electric connection, and other member may be separately formed for fixing the base unit body 2 and radio terminal 1 mechanically.

The base unit body 2 has a lid 8 with an L-shaped cross section capable of shielding the entire recess 3 having the opening 4 of the base unit body 2, in a state in which the radio terminal 1 is inserted inside of the base unit body 2 through the opening 4 of the base unit body 2. An end portion 13 of this lid 8 has a nail 14, and bumps 16 are formed at an end portion 15 opposite the end portion 13. Corresponding to this structure, openings 18 are formed in a side part 17 of the base unit body 2, and after fitting the bumps 16 of the lid 8 into the openings 18, by fitting the nail 14 of the lid 8 into part of the opening 4 of the base unit body 2, the lid 8 is fixed securely.

The opening 4 or lid 8 of the base unit body 2 may be formed in a U-shaped cross section, although not shown, when the recess 3 of the base unit body 2 is shaped as shown in FIG. 1B.

In this structure, the radio terminal 1 is fitted into the recess 3 of the base unit body 2, and the rear part is inserted into the opening 4. By connecting the connector 6 provided in the rear part 1*a* of the radio terminal 1 to the connector 7 of the printed circuit board 5 held in the base unit body 2, the radio terminal 1 is fixed at a position not projecting from the recess 3 formed in the base unit body 2. With this radio terminal 1 fixed in the base unit body 2, the signal data processed in the printed circuit board 5 held in the base unit body 2 is transmitted through the radio terminal 1. The input signal from the radio terminal 1 is processed in the printed circuit board 5 in the base unit body 2.

Thus, the radio terminal 1 is connected and fixed in the base unit body 2 without projecting from the recess 3 of the base unit body 2, and is completely shielded by the lid 8. When the lid 8 is removed, the radio terminal 1 can be pinched by fingers inside the recess 3. Therefore, the ease of detaching and attaching of the radio terminal 1 in the base unit body 2 is not sacrificed. The design of the base unit body 2 is improved regardless of the shape of the radio terminal 1, and invasion of foreign matter from the recess 3 into the base unit body 2 can be prevented.

(Embodiment 2)

Figure 4:
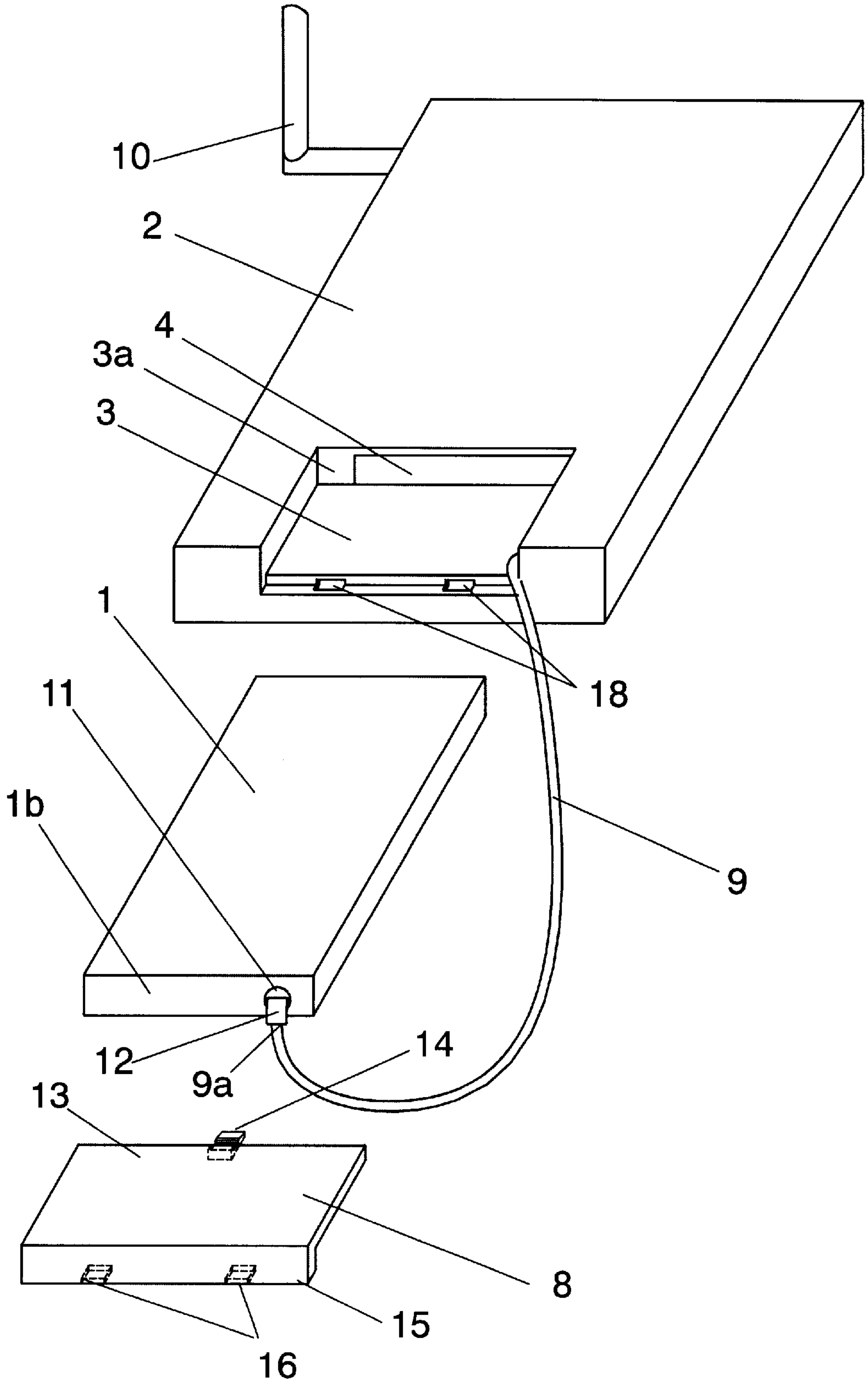
FIG. 4 is a perspective appearance view of a radio terminal and its base unit in embodiment 2 of the invention.

FIG. 4 is a perspective appearance view of a radio terminal and its base unit in embodiment 2 of the invention. In addition to the structure of embodiment 1, it is a feature of this embodiment 2 that an antenna is provided in the base unit body 2 of the radio terminal 1 for connecting with the radio terminal 1.

That is, as shown in FIG. 4, the base unit body 2 has an antenna 10 with a wired cable 9, and it is fixed to the base unit body 2. A terminal 12 is provided at the leading end 9*a* of the wired cable 9. The terminal 12 can be electrically connected to an external antenna terminal 11 provided at the front side 1*b* opposite the rear part 1 a having the connector 6 of the radio terminal 1.

By connecting the terminal 12 at the leading end 9*a* of the cable 9 to the external antenna terminal 11, the antenna terminal of the printed circuit board, not shown, held in the radio terminal 1 is connected to the antenna 10 of the base unit body 2 through the cable 9. By changeover in cooperation with this connection, the internal antenna (not shown) in the radio terminal 1 is designed not to be used. To this external antenna terminal 11, aside from the external antenna 10 attached to the base unit body 2, other external antenna (not shown) can also be connected. The parts having the same functions as in embodiment 1 are identified with the same reference numerals, and their description is omitted.

In this structure, the radio terminal 1 is fitted into the recess 3 of the base unit body 2, and inserted into the opening 4. The connector 6 provided at the rear part 1*a* of the radio terminal 1 is connected to the connector 7 disposed in the printed circuit board 5 held in the base unit body 2. Further, the terminal 12 of the wired cable 9 of the antenna 10 provided in the base unit body 2 and the external antenna terminal 11 of the radio terminal 1 are connected, and the recess 3 is shielded by the lid 8. The signal data processed in the printed circuit board 5 held in the base unit body 2 is transmitted from the antenna 10 through the radio unit of the radio terminal 1 and the wired cable 9. In the case of reception, the signal is processed in the printed circuit board 5 in the reverse path.

Thus, in embodiment 2, since the antenna 10 provided in the base unit body 2 is not required to be portable, it may be upgraded in performance with no consideration given to its size. The wired cable 9 for connecting the antenna 10 and radio terminal 1 can be wired inside of the base unit body 2. Thus, regardless of the design of the base unit body 2, the reaching distance and directivity of the radio wave can be enhanced.

(Embodiment 3)

Figure 5:
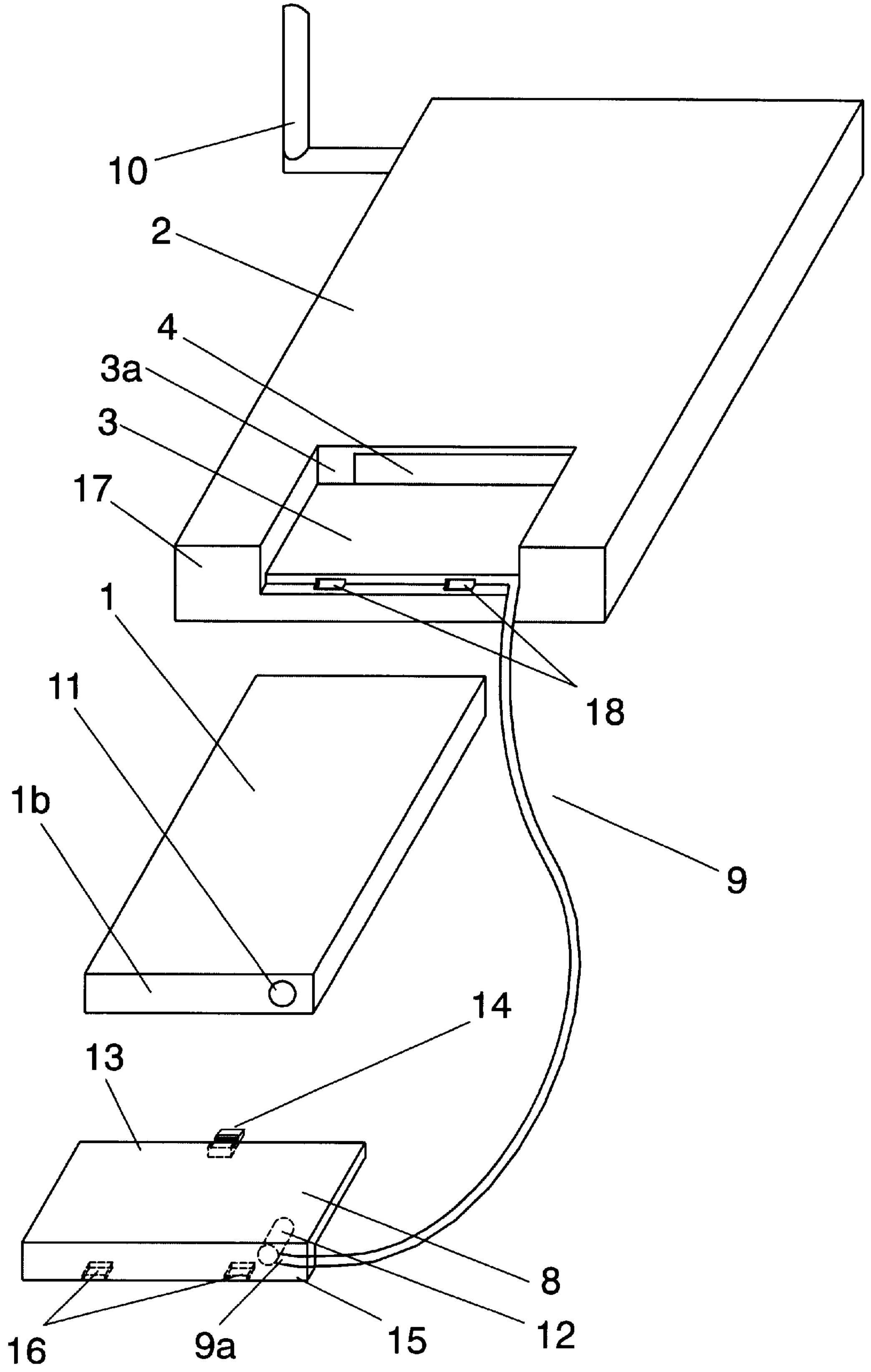
FIG. 5 is a perspective appearance view of a radio terminal and its base unit in embodiment 3 of the invention.
Figure 6:
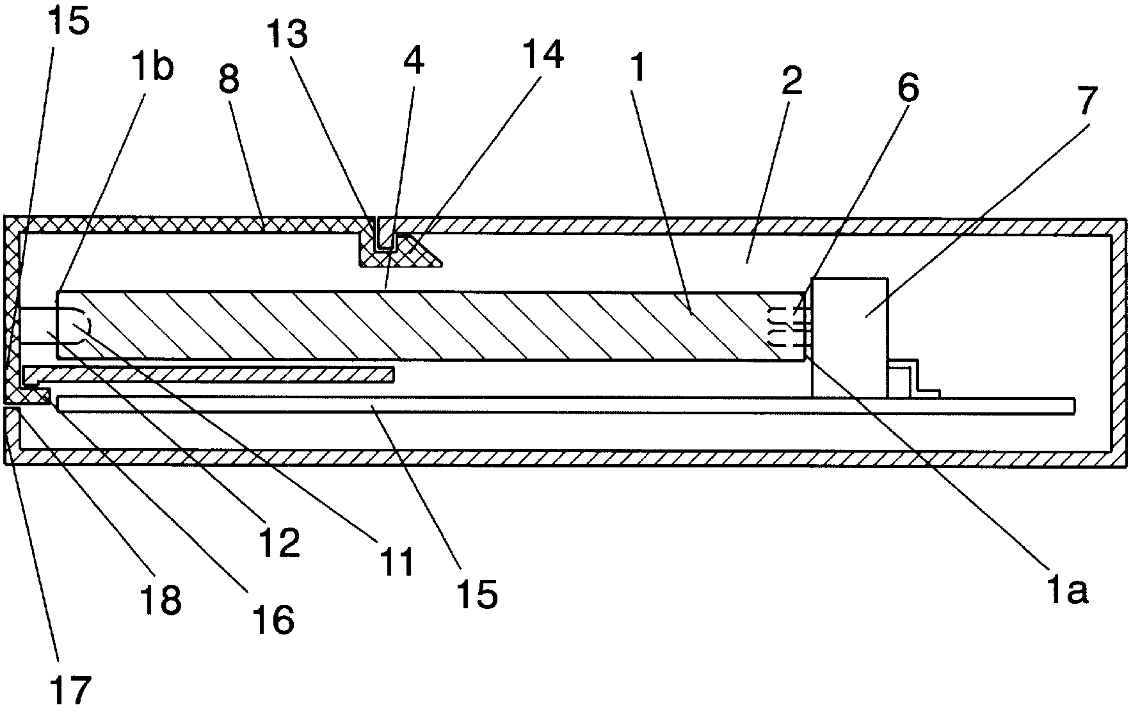
FIG. 6 is a longitudinal sectional view of the base unit accommodating the radio terminal.

FIG. 5 is a perspective appearance view of a radio terminal and its base unit in embodiment 3 of the invention, and FIG. 6 is a longitudinal sectional view of the base unit accommodating the radio terminal. In addition to the structure of embodiment 2, the feature of embodiment 3 lies in the connection structure of terminal 12 of wired cable 9 and external antenna terminal 11 of radio terminal 1.

That is, as shown in FIG. 5 and FIG. 6, at the lid 8 for shielding the recess 3 having the opening 4 of the base unit body 2, the terminal 12 of the wired cable 9 for connecting radio terminal 1 and the antenna 10 of the base unit body 2 is disposed and fixed at a position opposite to the external antenna terminal 11 of the radio terminal 1. The parts having the same functions as in embodiments 1 and 2 are identified with the same reference numerals, and their description is omitted.

In this structure, the radio terminal 1 is fitted into the recess 3 of the base unit body 2, and inserted into the opening 4. At this time, the connector 6 of the radio terminal 1 is connected to the connector 7 disposed on the printed circuit board 5 held in the base unit body 2. The recess 3 is shielded by the lid 8, and simultaneously the terminal 12 of the wired cable 9 fixed to the lid 8 is connected to the external antenna terminal 11 of the radio terminal 1. Thus, the working efficiency when assembling the base unit body 2 is improved. Further, the wired cable 9 is fitted to the antenna 10 provided in the base unit body 2. Since the terminal 12 of the wired cable 9 is connected to the lid 8, the lid 8 is always confined within the base unit body 2.

Hence, loss of the lid 8 can be prevented.

(Embodiment 4)

Figure 7:
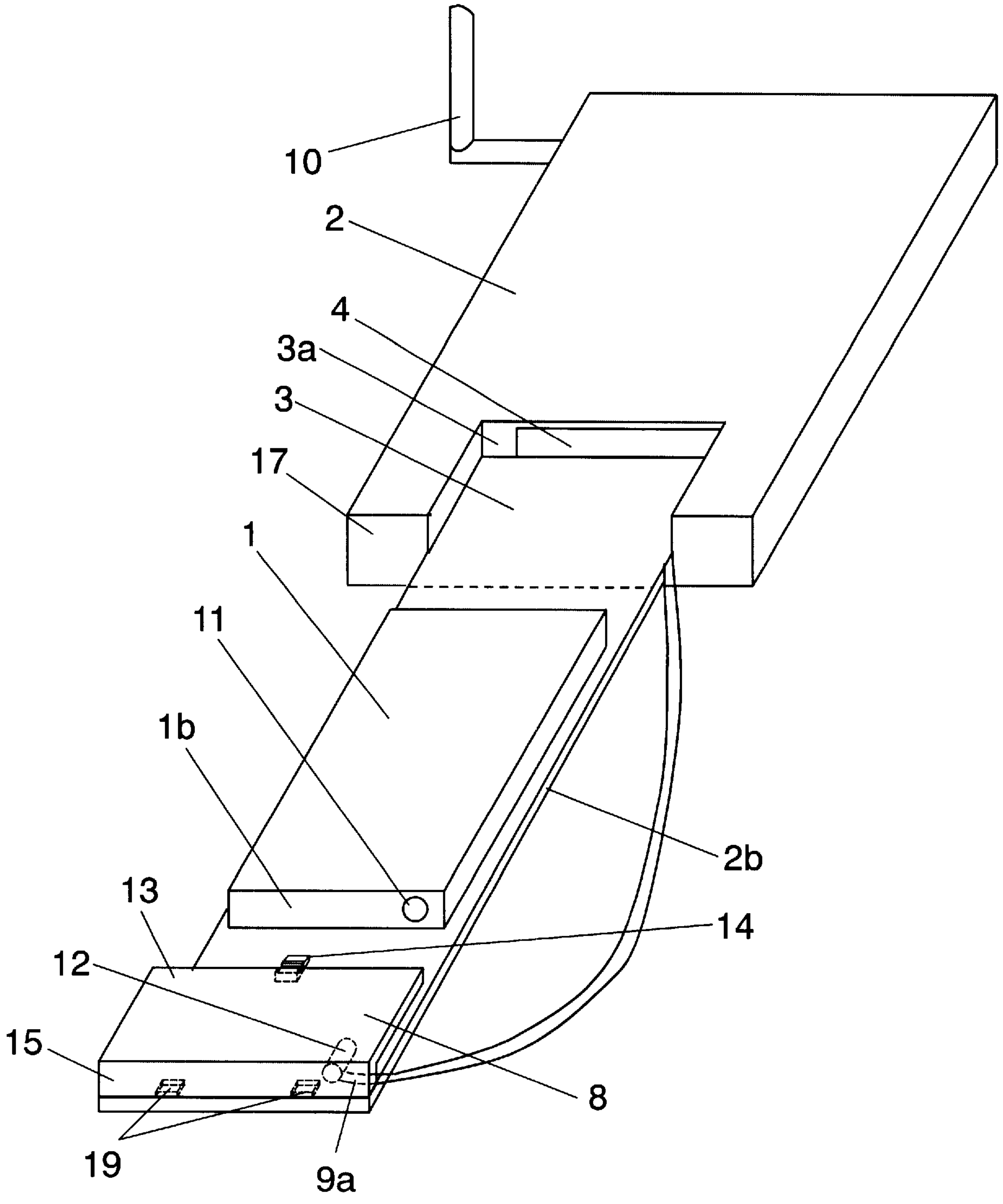
FIG. 7 is a perspective appearance view of a radio terminal and its base unit in embodiment 4 of the invention.

FIG. 7 is a perspective appearance view of a radio terminal and its base unit in embodiment 4 of the invention. In the foregoing embodiments, the lid 8 is separate from the base unit body 2, and in embodiments 2 and 3, it is confined only by the cable 9. In this embodiment, as shown in FIG. 7, the lid 8 is rotatably fitted with a hinge 19 to the end of a slide member 2*b* capable of sliding the lid 8 mechanically from the base unit body 2.

In this structure, when taking out the radio terminal 1, first, the slide member 2*b* is drawn out from the base unit body 2 by sliding. Next, after pulling out the terminal 12 of the cable 9 from the external antenna terminal 11, the lid 8 is rotated by the hinge 19 and opened, so that the radio terminal 1 can be taken out. Alternatively, the lid 8 may be formed integrally with the slide member 2*b*, and a mount may be provided instead of the hinge 19. Similarly, in embodiments 1 and 2, the lid 8 may be fitted to the base unit body 2 by mount or hinge, and the lid 8 may be rotated to take out the lid 8.

(Embodiment 5)

Figure 8:
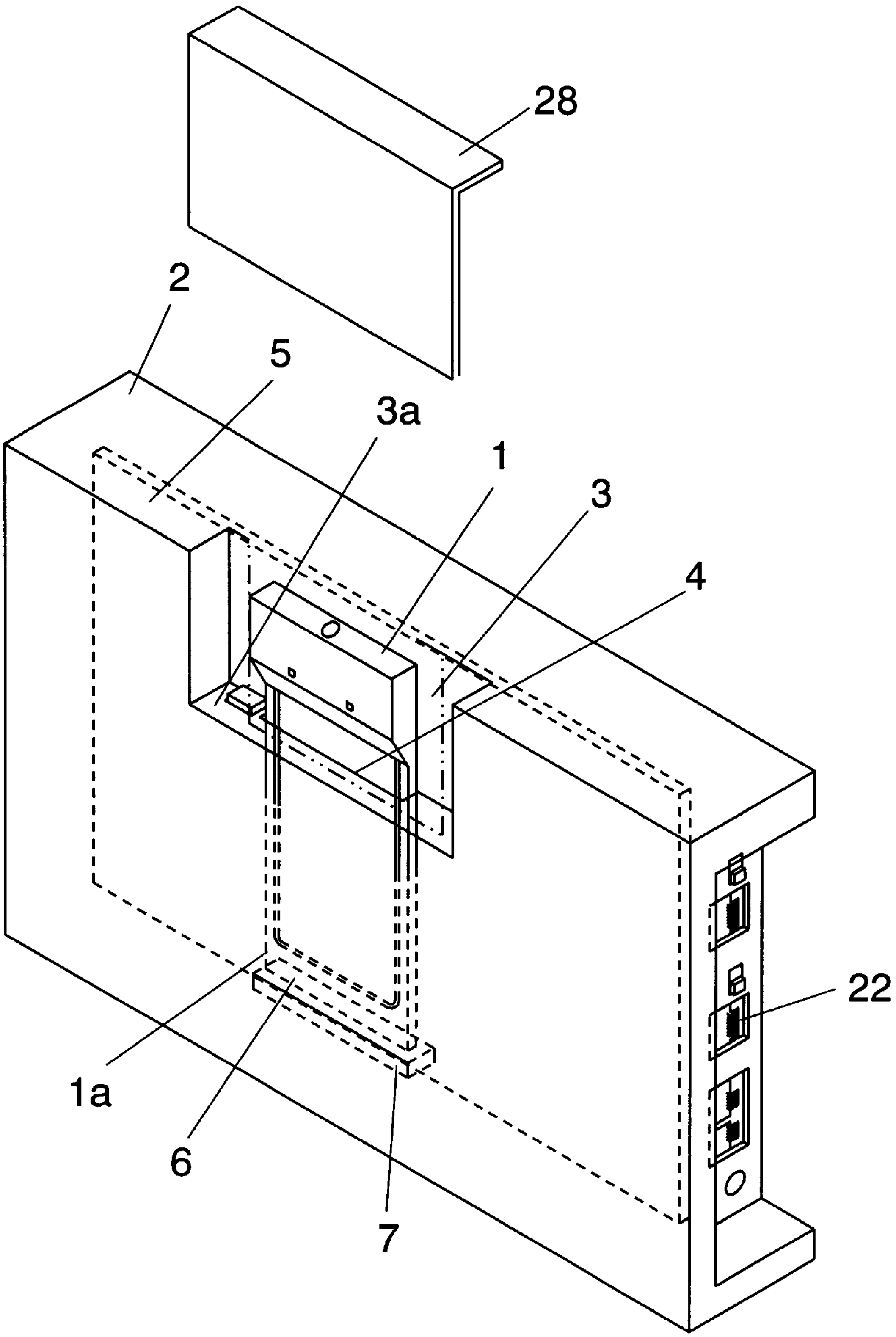
FIG. 8 is a perspective appearance view of a radio terminal and its base unit in embodiment 5 of the invention.
Figure 10:
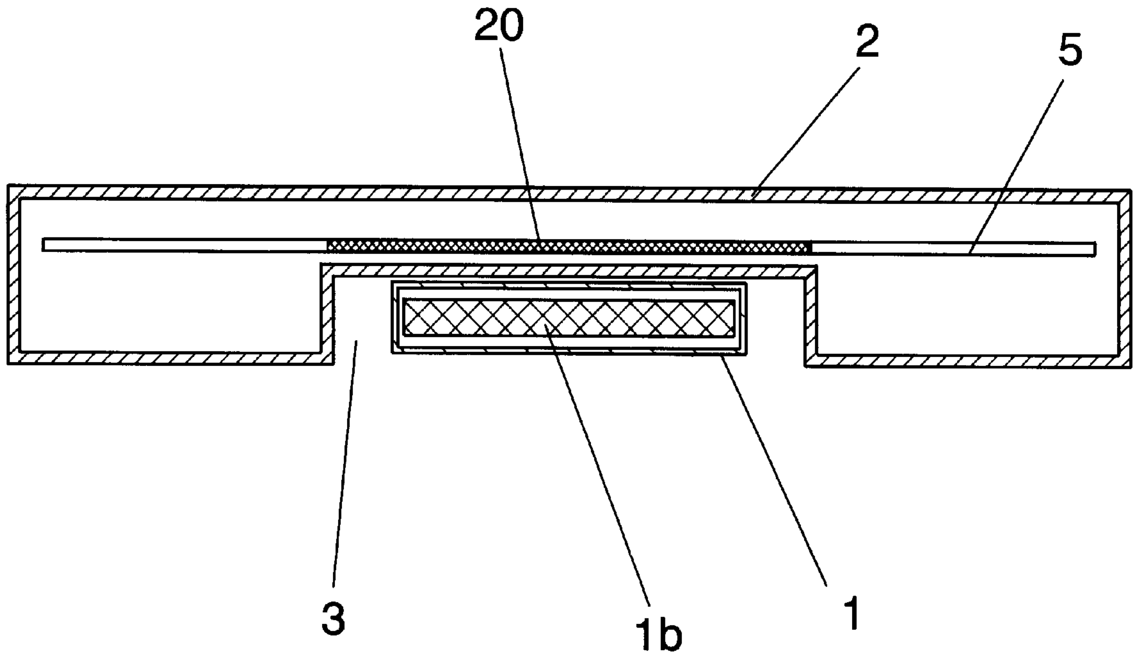
FIG. 10 is a cross sectional view of the radio terminal and its base unit in embodiment 5 of the invention.
Figure 11:
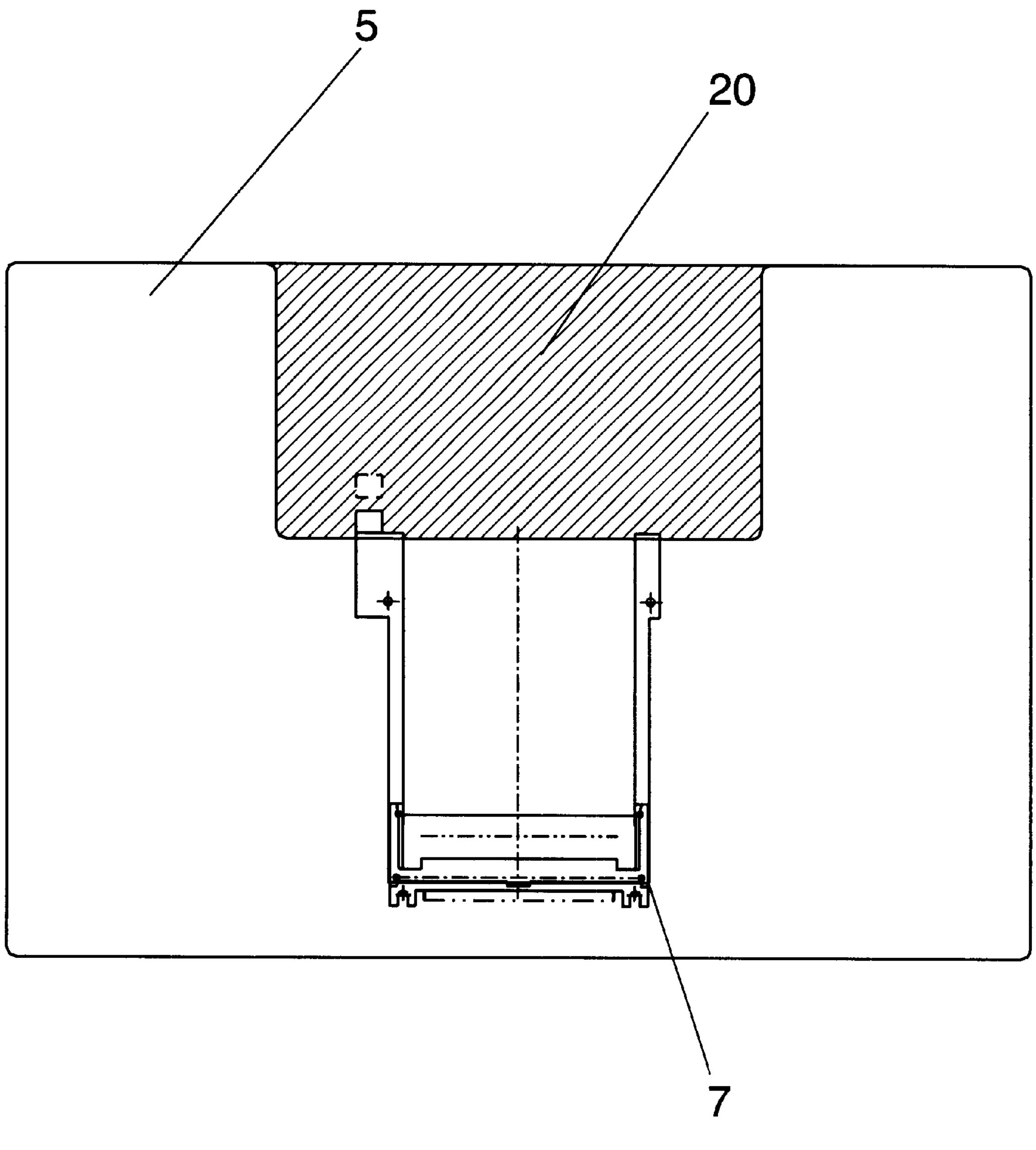
FIG. 11 is a printed circuit board diagram of the base unit of the radio terminal in embodiment 5 of the invention.

In this example, the base unit of the radio terminal is used as the network connection device. FIG. 8 is a perspective appearance view of a network connection device in embodiment 5 of the invention, FIG. 9 is a longitudinal sectional view of the network connection device, FIG. 10 is a cross sectional view of the network connection device, and FIG. 11 is a printed circuit board diagram of the network connection device.

As shown in FIG. 8 to FIG. 11, the network connection device can make wired communications of various data between radio terminals (between the radio terminal 1 connected to the base unit body 2, and other radio terminals that are not shown). In this network connection device, wired communication is possible from the base unit body 2 to other devices.

Figure 9:
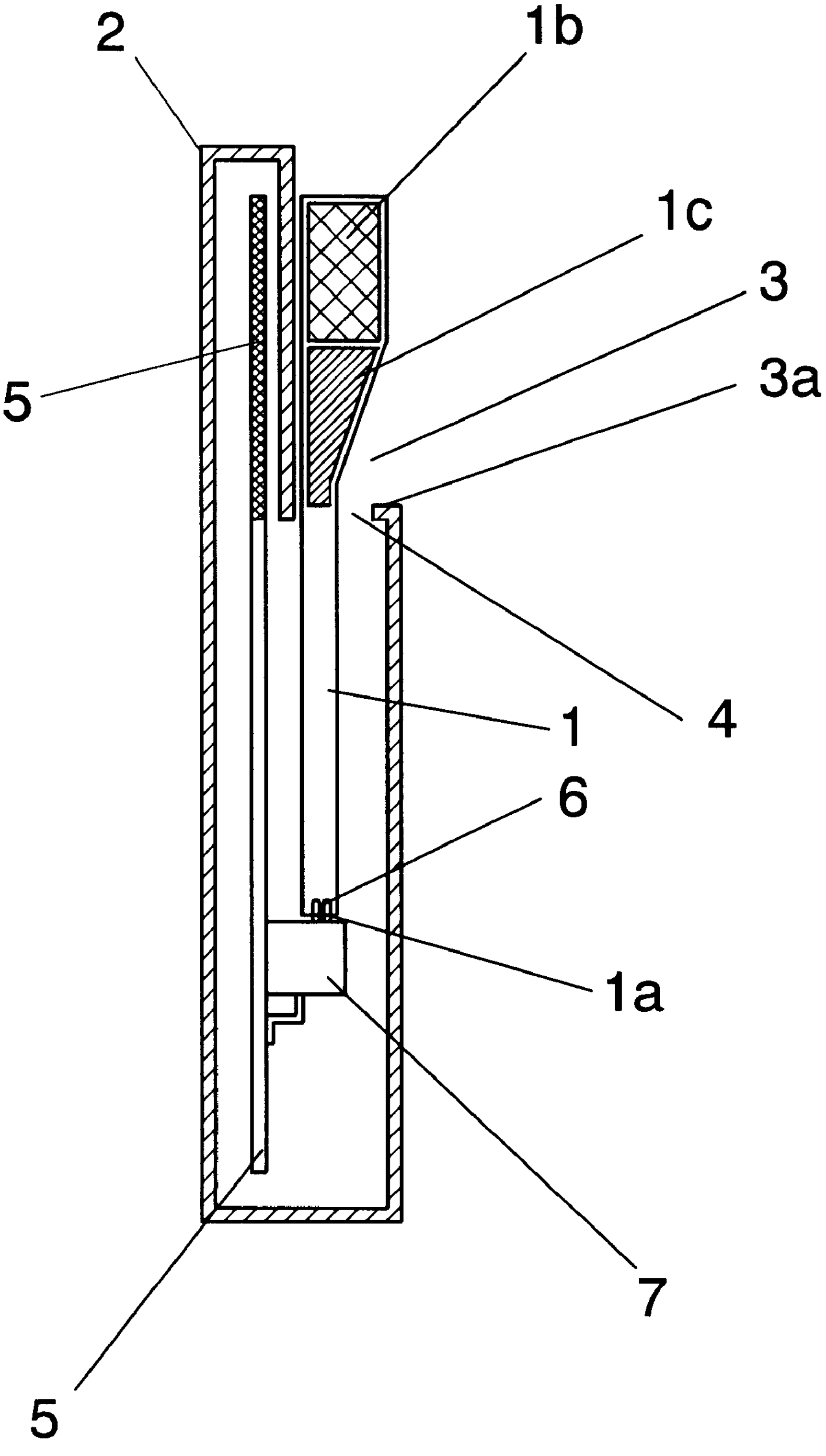
FIG. 9 is a longitudinal sectional view of the radio terminal and its base unit in embodiment 5 of the invention.

As shown in FIG. 9, the radio terminal 1 incorporates the antenna 1*b* and radio unit 1*c*, and the base unit body 2 is formed large enough to accommodate this radio terminal 1.

The base unit body 2 has a recess 3 formed over two substantially mutually orthogonal planes of the box. The size of the recess 3 is preferably large enough to accommodate about half of the radio terminal 1 in the length direction, but it is not particularly limited.

Meanwhile, the recess 3 may be formed only in a state allowing the end of the base unit body 2 to be open, and is not limited to two substantially mutually orthogonal planes of the box. The base unit body 2 is not limited to the box shape, but may be designed in a curved shape or the like.

At the inner side 3*a* of the recess 3, there is an opening 4 for inserting a part of the radio terminal 1 into the base unit body 2. The width of the recess 3 is preferred to be large enough to allow the radio terminal 1 to be pinched by fingers when the radio terminal 1 is connected and fixed in the base unit body 2, but it is not particularly limited.

Inside of the base unit body 2, a printed circuit board 5 is held. The printed circuit board 5 has a connector 7 for electrically connecting with a connector 6 provided in the rear part 1*a* of the radio terminal 1. Further, in part of the printed circuit board 5 overlapping with one of antenna 1*b* or radio unit 1*c* of the radio terminal 1 when the radio terminal 1 is connected and fixed to the base unit body 2, there is a conductor-free portion 20 free from conductor parts (including all of electrical parts, power source, ground, signal pattern). This portion 20 free from conductor parts of the printed circuit board 5 includes all of the surface layer (face, back) and inner layer of the printed circuit board 5.

The size of the portion 20 free from conductor parts must be larger than the size of at least the antenna 1*b* of the radio terminal 1. The parts having the same function as in the prior art are identified with the same reference numerals, and the description is omitted.

In this structure, the radio terminal 1 is fitted into the recess 3 of the base unit body 2, and the rear part 1*a* is inserted into the opening 4. By connecting the connector 6 provided in the rear part 1*a* to the connector 7 of the printed circuit board 5 held in the base unit body 2, at this time, the radio terminal 1 is fixed in the recess 3 of the base unit body 2. With this radio terminal 1 fixed in the base unit body 2, the signal data processed in the printed circuit board 5 held in the base unit body 2 is transmitted through the radio terminal 1. The signal entering from the radio terminal 1 is processed in the printed circuit board 5 in the base unit body 2. At this time, due to the conductor-free portion 20 of the printed circuit board 5 held in the base unit body 2, electromagnetic effects on the antenna 1*b* can be suppressed. Besides, since the circuit of the printed circuit board 5 is located apart from the antenna 1*b* and radio unit 1*c* of the radio terminal 1, the radio terminal 1 can always operate normally without having effects of electric noise from the printed circuit board 5.

Further, when the base unit body 2 is installed in a wall-mount, vertical, or horizontal position, the distance between the circuit of the printed circuit board 5 in the base unit body 2 and the antenna 1*b* and radio unit 1*c* in the radio terminal 1 is always constant, and there is no change in the operation of radio communication.

Thus, since the radio terminal 1 is connected and fixed in the recess 3 of the base unit body 2, it is easy to attach and detach the radio terminal 1 in the base unit body 2. Moreover, since there is the conductor-free portion 20 of the printed circuit board 5 held in the base unit body 2, when the radio terminal 1 is connected and fixed to the base unit body 2, electromagnetic effects on the antenna 1*b* can be suppressed. Still more, it is also possible to prevent effects of electric noise from the printed circuit board 5 in the base unit body 2 on the antenna 1*b* and radio unit 1*c* of the radio terminal 1. It is thus possible to easily prevent deterioration of performance such as radio wave reaching distance and directivity of the radio terminal 1.

In other structure, the radio terminal 1 may project from part of the base unit body 2. Or, the recess 3 may incorporate the radio terminal 1 electrically connected and fixed to the base unit body 2, and a cover 28 for shielding the recess 3.

(Embodiment 6)

Figure 12:
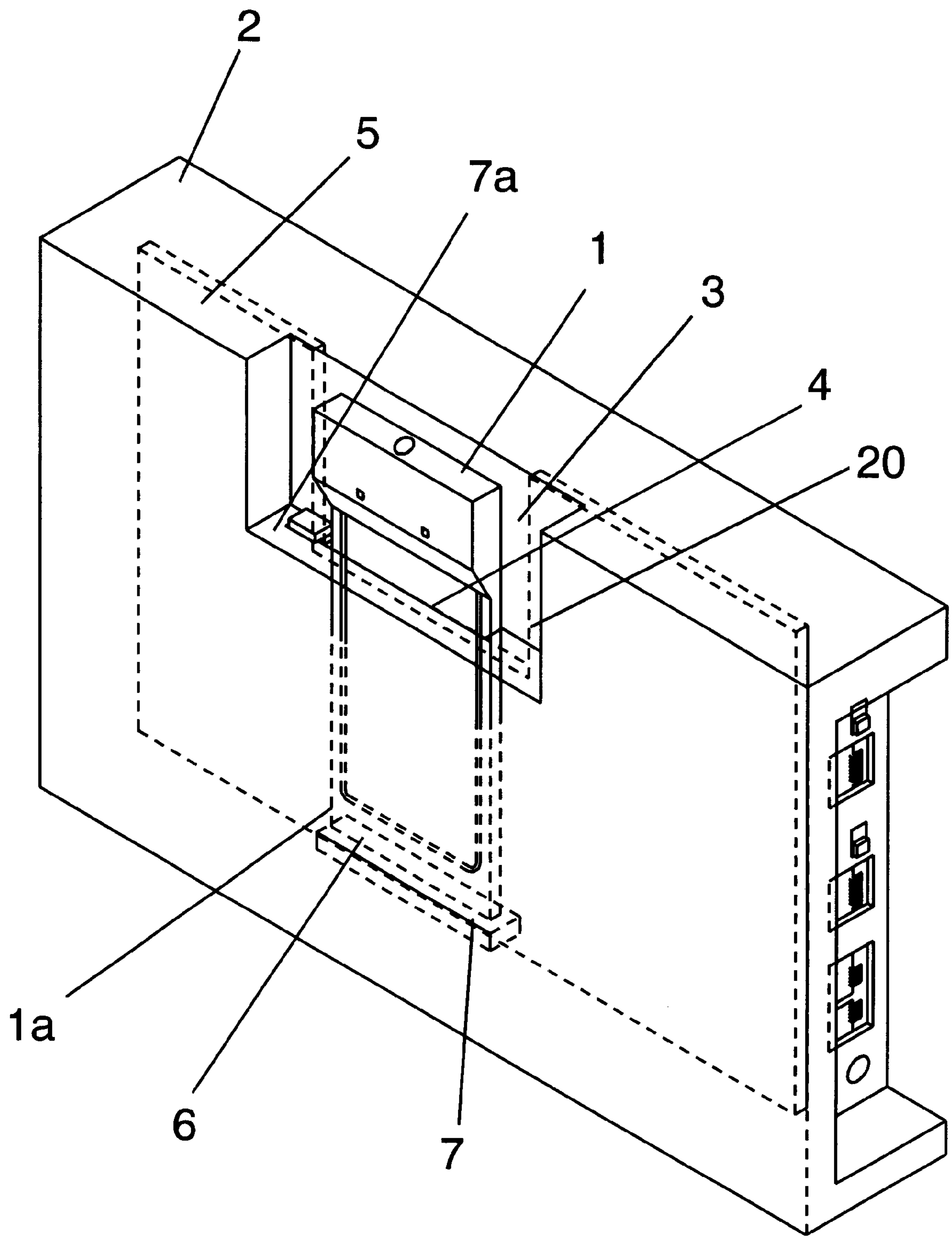
FIG. 12 is a perspective appearance view of a radio terminal and its base unit in embodiment 6 of the invention.
Figure 13:
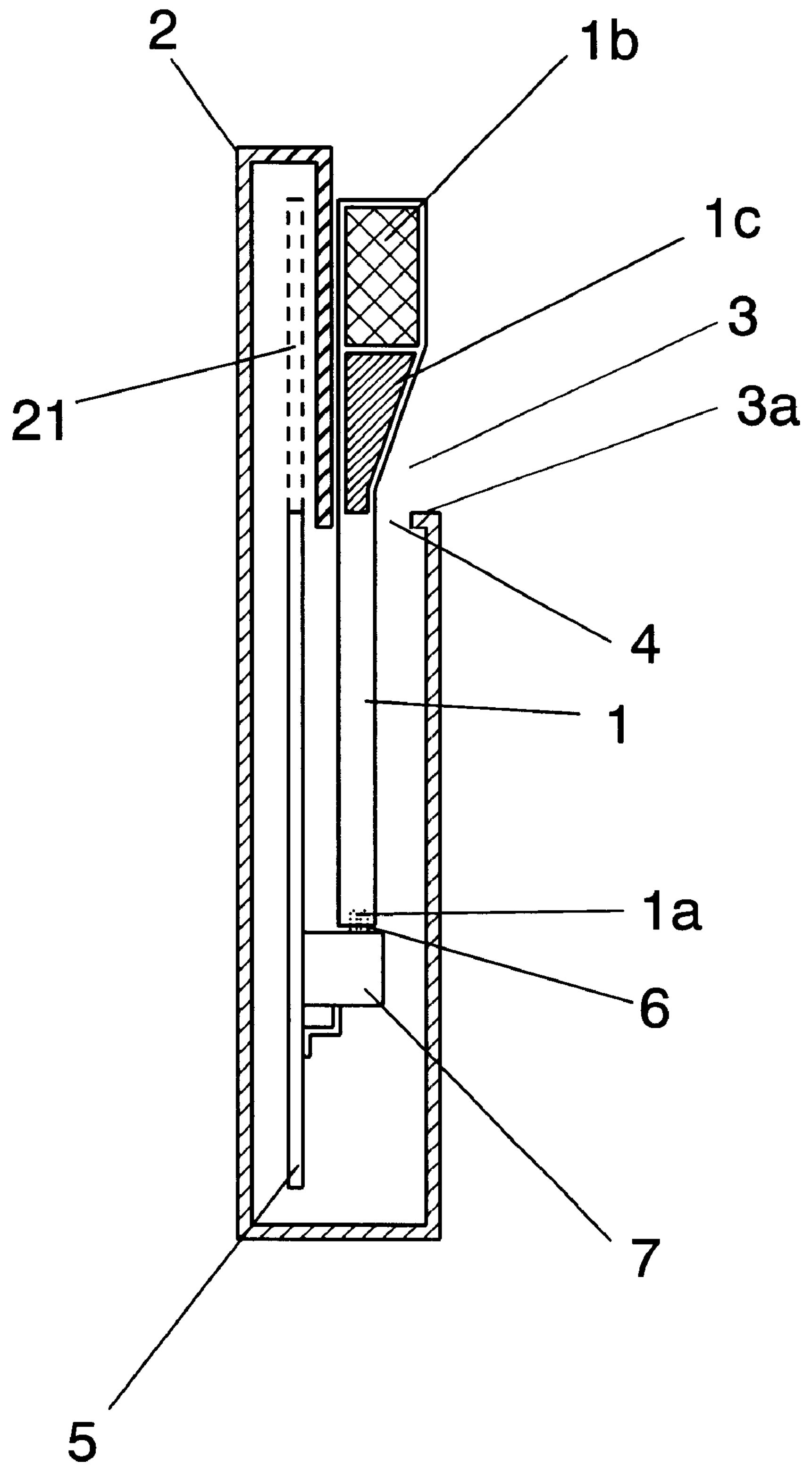
FIG. 13 is a longitudinal sectional view of the radio terminal and its base unit in embodiment 6 of the invention.
Figure 14:
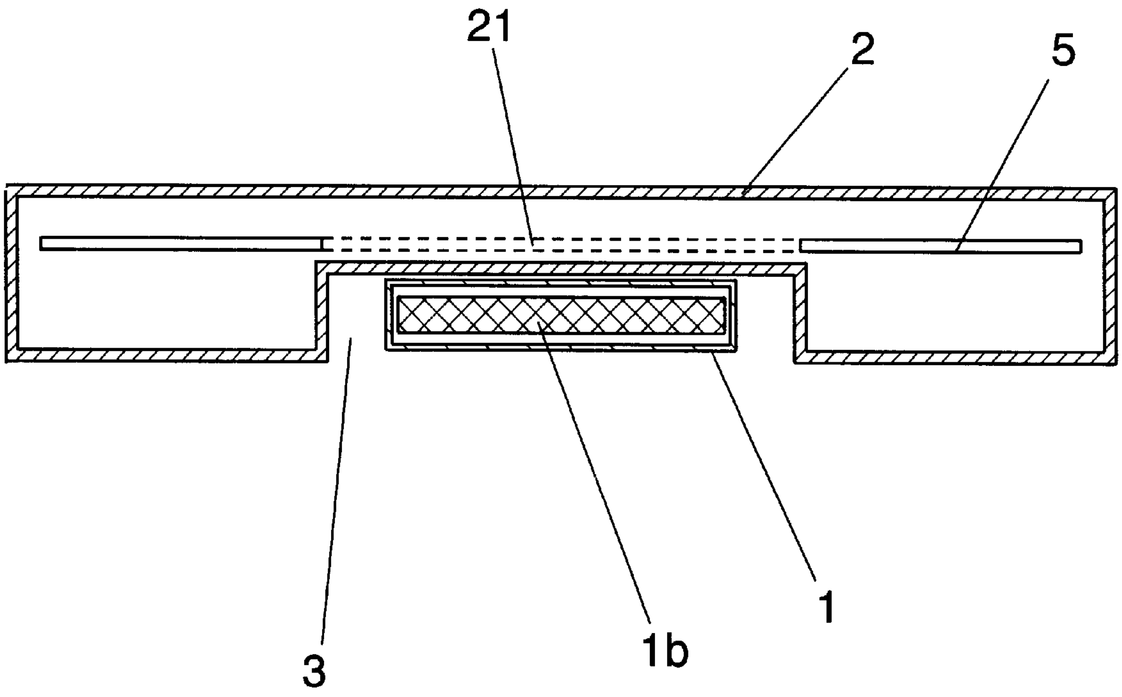
FIG. 14 is a cross sectional view of the radio terminal and its base unit in embodiment 6 of the invention.
Figure 15:
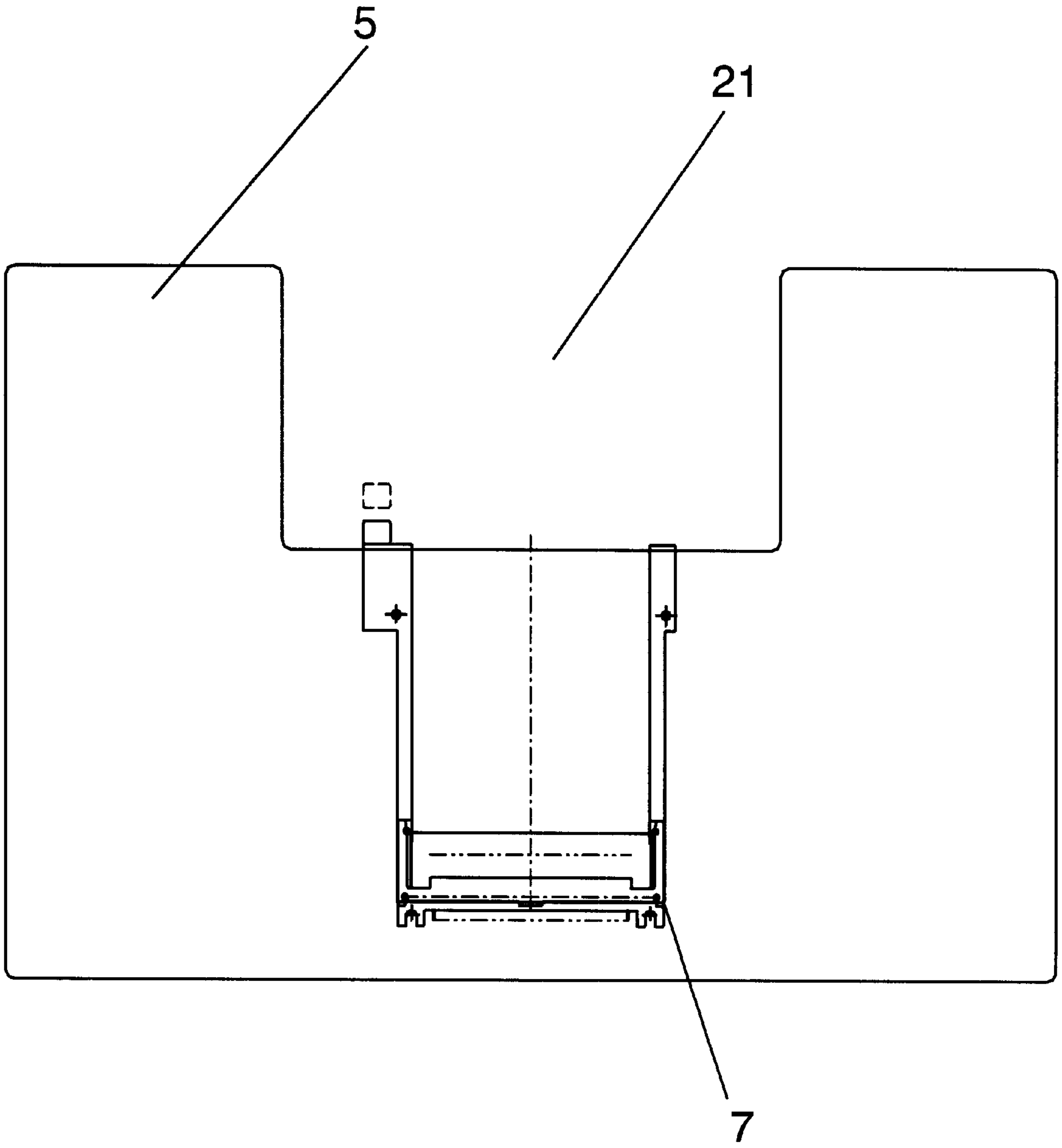
FIG. 15 is a printed circuit board diagram of the base unit of the radio terminal in embodiment 6 of the invention.

FIG. 12 is a perspective appearance view of a network connection device in embodiment 6 of the invention, FIG. 13 is a longitudinal sectional view of the network connection device, FIG. 14 is a cross sectional view of the network connection device, and FIG. 15 is a printed circuit board diagram of the network connection device.

The embodiment is similar to embodiment 5, except that part of the printed circuit board 5 held in the base unit body 2 is cut off.

As shown in FIG. 12 to FIG. 15, when the radio terminal 1 is connected and fixed to the connector 7 mounted on the printed circuit board 5 held in the base unit body 2 through the opening 4 of the base unit body 2, there is a notch 21 in the portion of the printed circuit board 5 that overlaps with the antenna 1*b* and radio unit 1*c* of the radio terminal 1. The notch area of the printed circuit board 5 of the base unit body 2 in the embodiment is wider than the area of the antenna 1*b* or radio unit 1*c* of the radio terminal 1, but in order to suppress effects on the antenna, the area is required to be at least larger than that of the antenna 1*b*.

Thus, in the embodiment, by forming the notch 21 in part of the printed circuit board 5 held in the base unit body 2, when the radio terminal 1 is connected and fixed to the base unit body 2, effects of dielectric material for forming the printed circuit board 5 can be eliminated, and deterioration of performance of reaching distance of the radio terminal 1 can be prevented easily.

(Embodiment 7)

Figure 16:
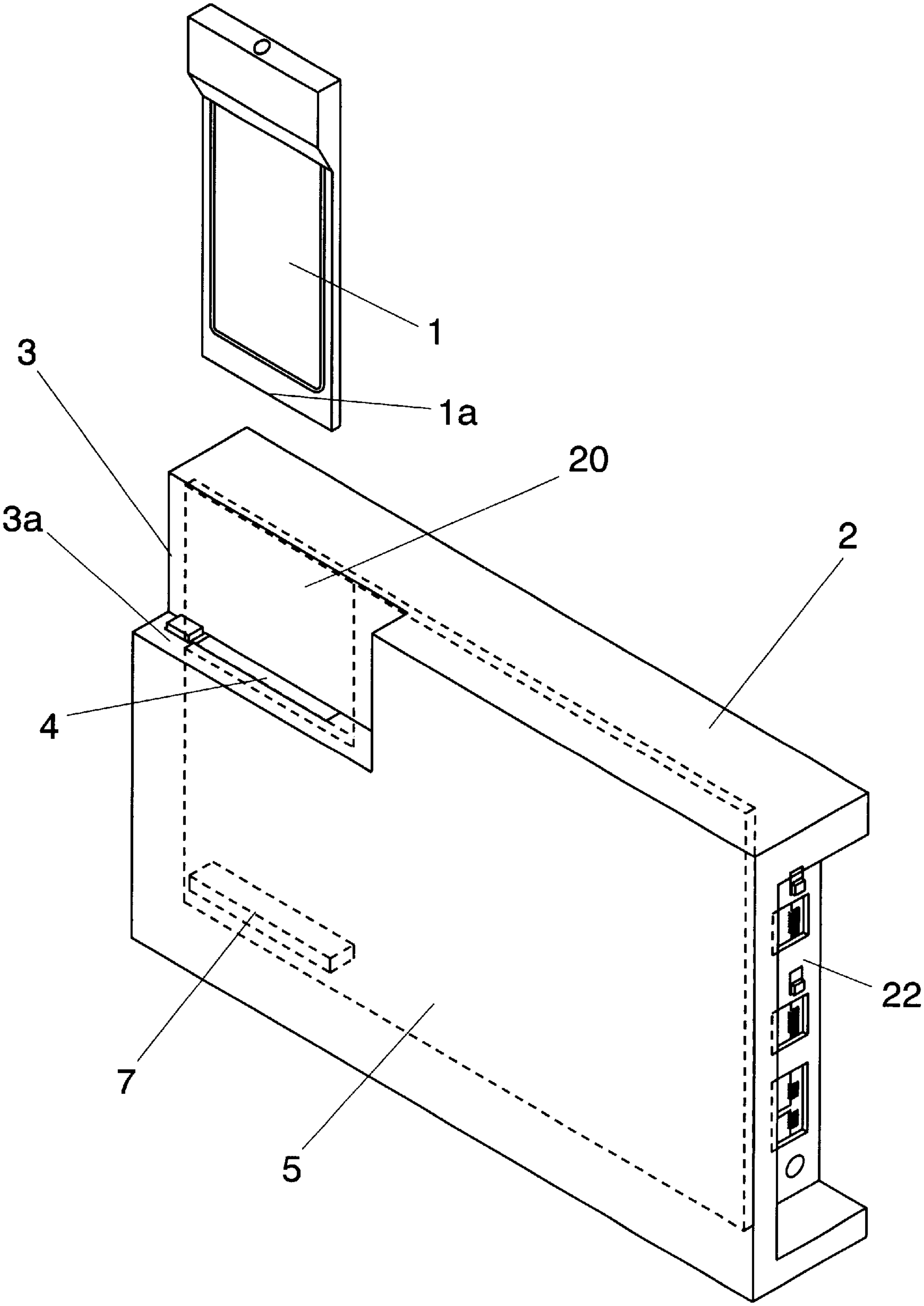
FIG. 16 is a perspective appearance view of a radio terminal and its base unit in embodiment 7 of the invention.
Figure 17:
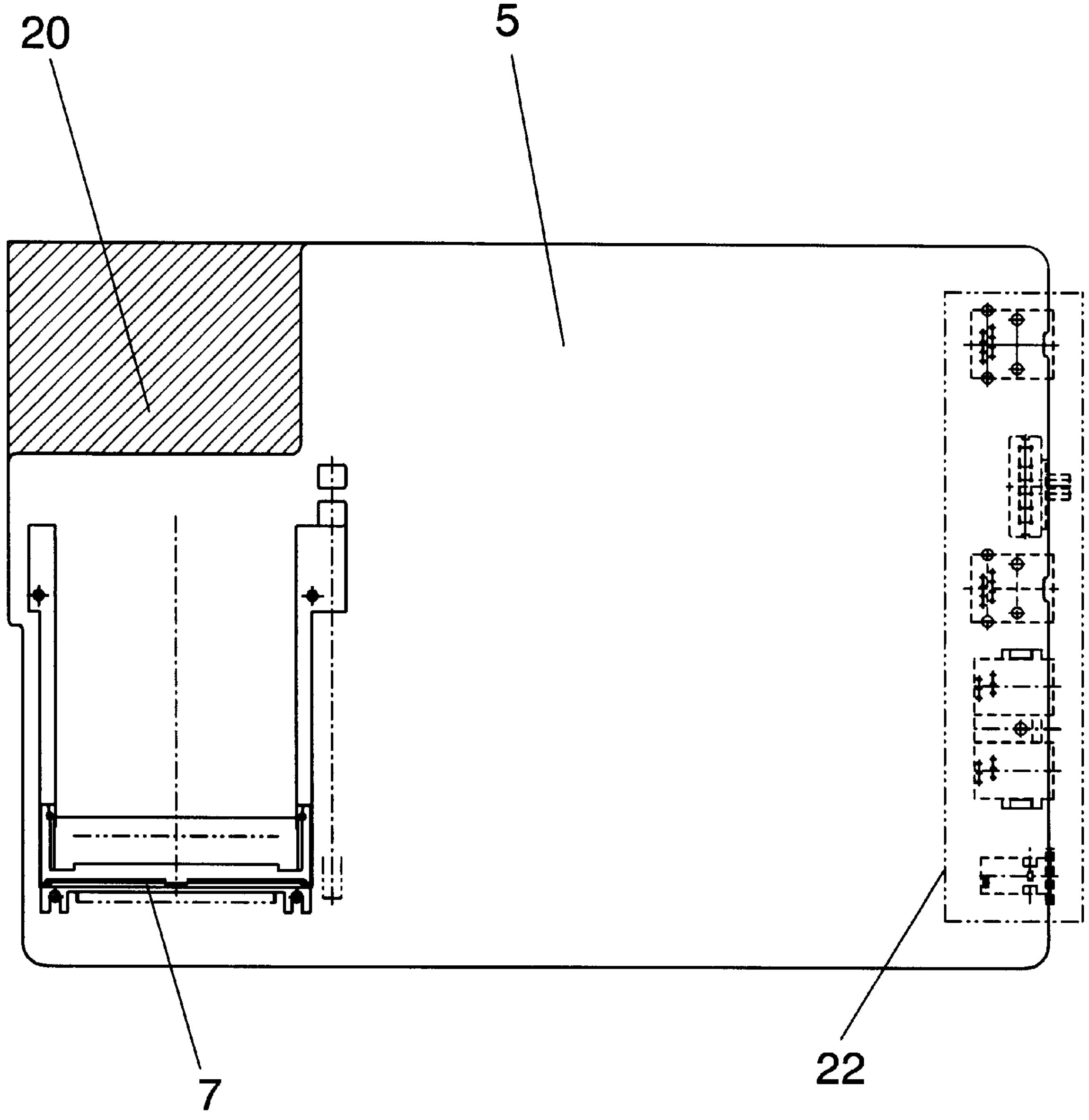
FIG. 17 is a printed circuit board diagram of the base unit of the radio terminal in embodiment 7 of the invention.

FIG. 16 is a perspective appearance view of a network connection device in embodiment 7 of the invention, and FIG. 17 is a printed circuit board diagram of the network connection device.

The radio terminal 1 is the same as in the foregoing embodiments, and the antenna 1*b* and radio unit 1*c* (not shown) are provided inside. The base unit body 2 is large enough to accommodate the radio terminal 1.

As shown in FIG. 16 and FIG. 17, the base unit body 2 has a recess 3 formed over three substantially mutually orthogonal planes of the box at the end. The size of the recess 3 is preferably large enough to accommodate about half of the radio terminal 1 in the length direction, but it is not particularly limited.

Meanwhile, the base unit body 2 is not limited to the box shape, but may be designed in a curved shape or the like.

At the inner side 3*a* of the recess 3, there is an opening 4 for inserting the radio terminal 1 into the base unit body 2. The recess 3 is preferred to be large enough to allow the radio terminal 1 to be pinched by fingers when the radio terminal 1 is connected and fixed in the base unit body 2, but it is not particularly limited.

Inside of the base unit body 2, a printed circuit board 5 is held. The printed circuit board 5 has a connector 7 for electrically connecting with a connector 6 provided in the rear part 1*a* of the radio terminal 1 at the end of the printed circuit board. Further, in part of the printed circuit board 5 overlapping with one of antenna 1*b* or radio unit 1*c* of the radio terminal 1 when the radio terminal 1 is connected and fixed to the base unit body 2, there is a conductive-free portion 20 free from conductor parts (including all of electrical parts, power source, ground, signal pattern) at the end of the printed circuit board. This portion 20 free from conductor parts of the printed circuit board 5 includes all of the surface layer (face, back) and inner layer of the printed circuit board 5.

The size of the portion 20 free from conductor parts must be larger than the size of at least the antenna 1*b* of the radio terminal 1.

In this structure, the radio terminal 1 is fitted into the recess 3 provided at the end of the base unit body 2. The radio terminal 1, by inserting its rear part 1*a* into the opening 4 and connecting the connector 6 provided in the rear part 1*a* to the connector 7 disposed at the end of the printed circuit board 5 held in the base unit body 2, is fixed in the recess 3 of the base unit body 2. With this radio terminal 1 fixed in the base unit body 2, the signal data processed in the printed circuit board 5 held in the base unit body 2 is transmitted through the radio terminal 1. Also the input signal from the radio terminal 1 is processed in the printed circuit board 5 in the base unit body 2. At this time, due to the conductive-free portion 20 of the printed circuit board 5 held in the base unit body 2, since the circuit of the printed circuit board 5 is located away from the antenna 1*b* and radio unit 1*c* of the radio terminal 1, electromagnetic effects on the antenna 1*b* can be suppressed. Moreover, the radio terminal 1 can always operate normally without having effects of electric noise from the printed circuit board 5.

Further, when the base unit body 2 is installed in a wall-mount, vertical, or horizontal position, the distance between the circuit of the printed circuit board 5 in the base unit body 2 and the antenna 1*b* and radio unit 1*c* in the radio terminal 1 is always constant, and there is no change in the operation of radio communication.

Thus, since the radio terminal 1 is connected and fixed in the recess 3 of the base unit body 2, it is easy to attach and detach the radio terminal 1 in the base unit body 2. Moreover, since there is the conductive-free portion 20 free from conductor parts in part of the printed circuit board 5 held in the base unit body 2, when the radio terminal 1 is connected and fixed to the base unit body 2, it is possible to prevent effects of electric noise from the printed circuit board 5 in the base unit body 2 on the antenna 1*b* and radio unit 1*c* of the radio terminal 1, and it is also easy to prevent deterioration of performance such as reaching distance and directivity of the radio terminal 1, while the area of the conductor-free portion free from conductor parts can be reduced, and the layout of components mounted on the printed circuit board 5 and the layout of the pattern can be designed efficiently. Therefore, the entire circuit board can be designed to be compact, and the cost can be reduced.

(Embodiment 8)

Figure 18:
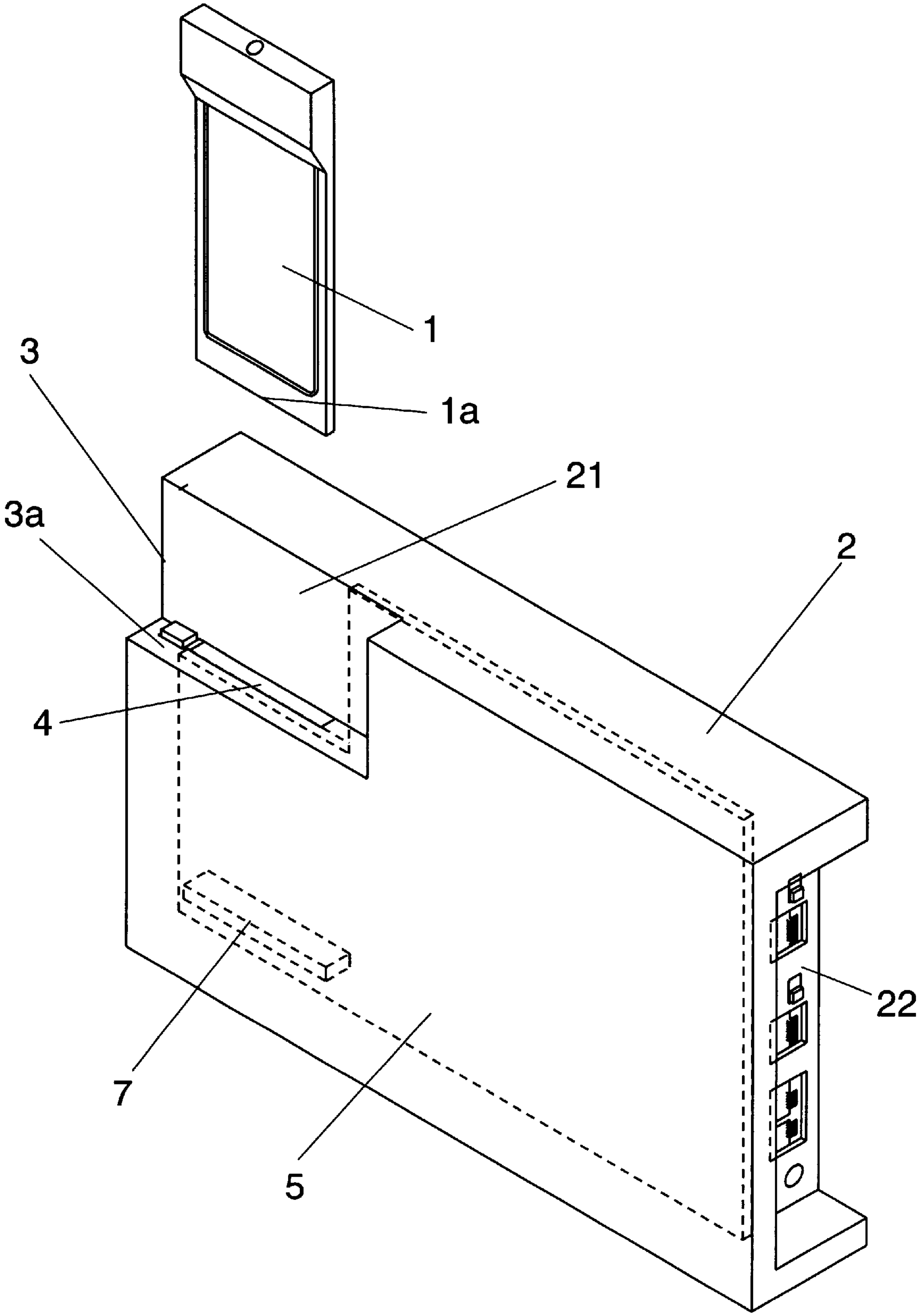
FIG. 18 is a perspective appearance view of a radio terminal and its base unit in embodiment 8 of the invention.
Figure 19:
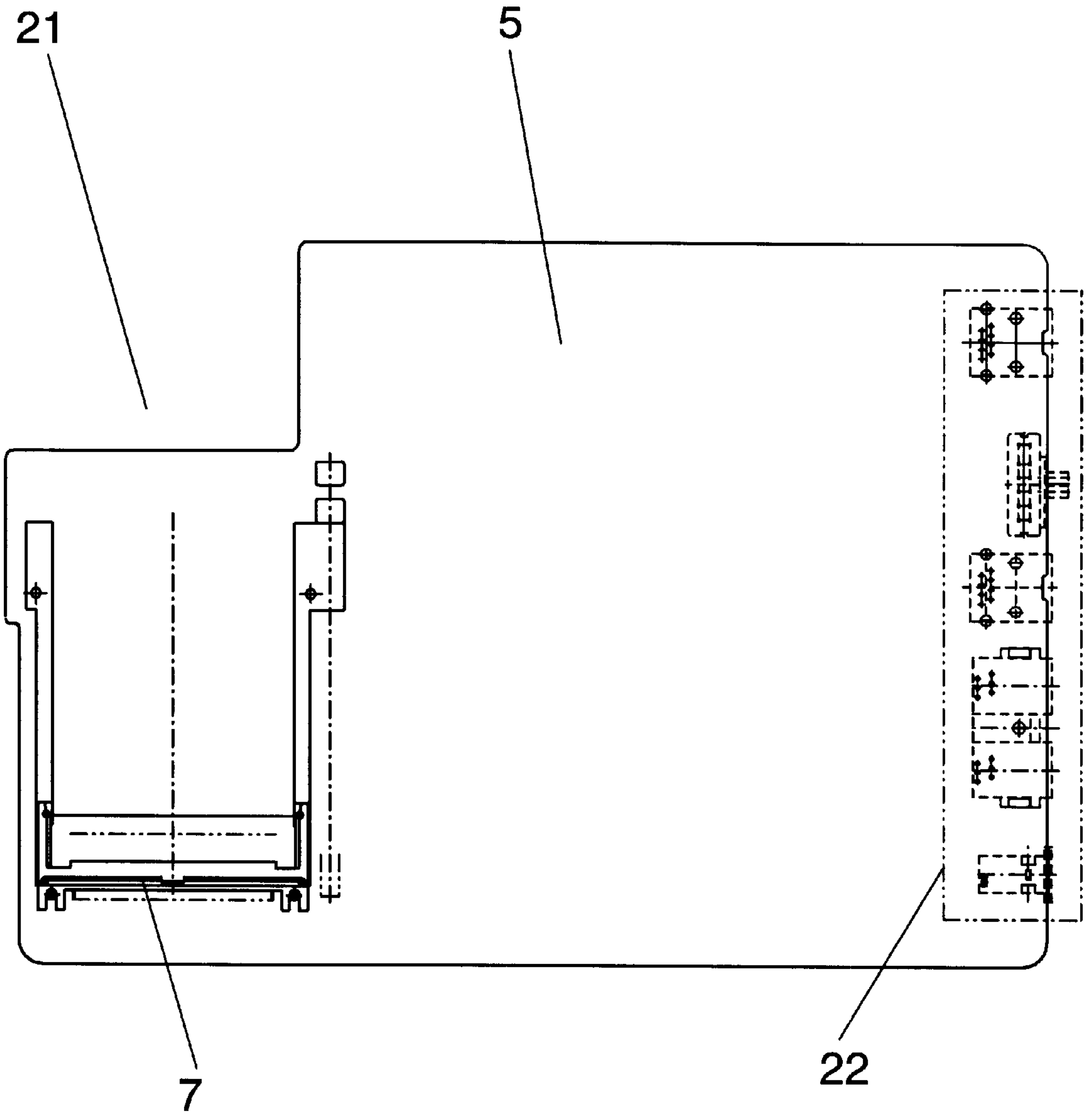
FIG. 19 is a printed circuit board diagram of the base unit of the radio terminal in embodiment 8 of the invention.

FIG. 18 is a perspective appearance view of a network connection device in embodiment 8 of the invention, and FIG. 19 is a printed circuit board diagram of the network connection device.

This embodiment is similar to embodiment 7, except that there is a notch 21 in part of the printed circuit board 5 held in the base unit body 2. The radio terminal 1 is the same as in the foregoing embodiments, and the antenna 1*b* and radio unit 1*c* (not shown) are provided inside. The base unit body 2 is large enough to accommodate the radio terminal 1. The other structure is the same as in embodiment 7. When the radio terminal 1 is connected and fixed to the base unit body 2, the notch 21 allows effects of not only the conductive parts but also dielectric material forming the printed circuit board 5 to be eliminated. Thus, performance deterioration of radio wave reaching distance of the radio terminal 1 can be easily prevented, in the same way as in embodiment 6.

(Embodiment 9)

Figure 20:
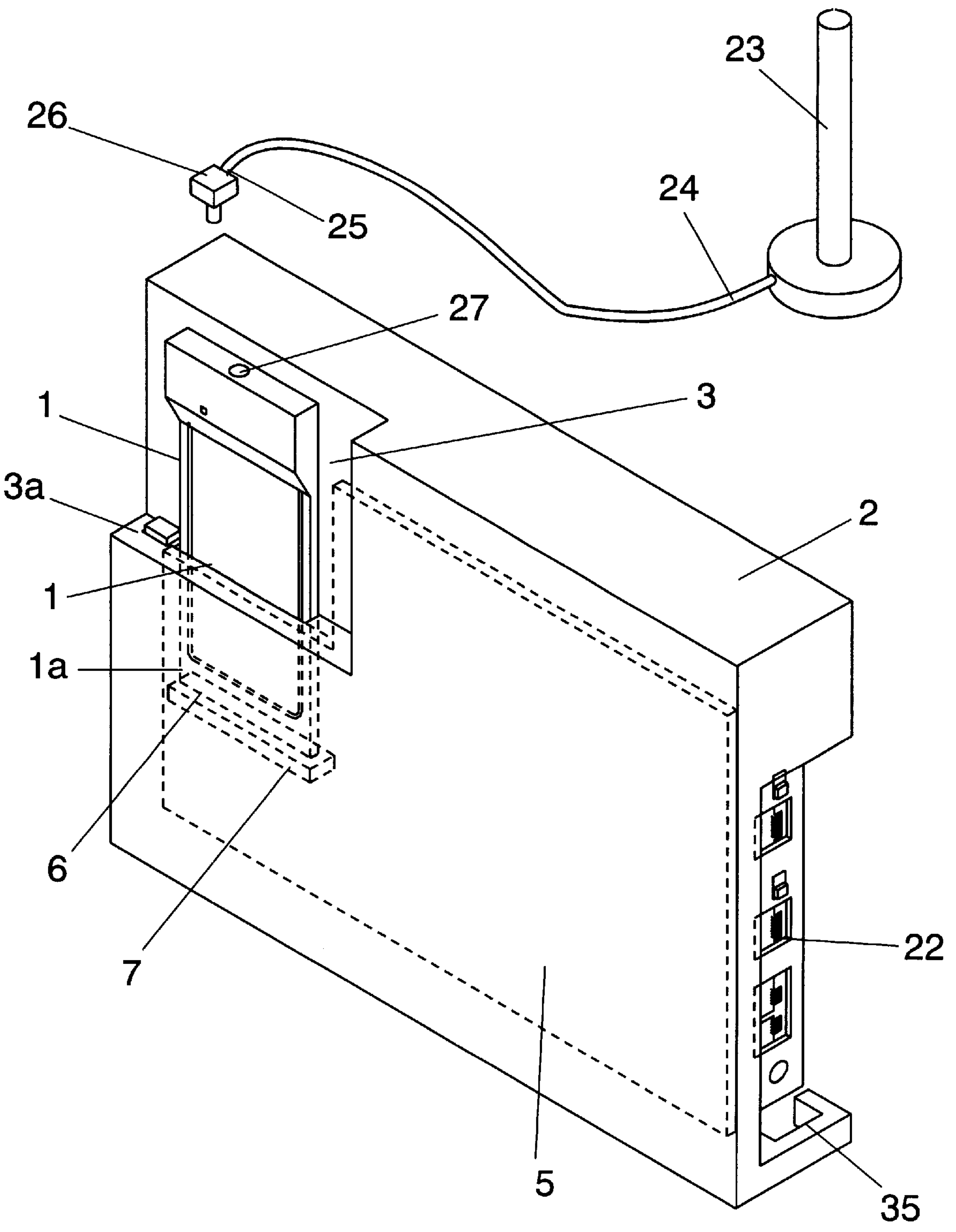
FIG. 20 is a perspective appearance view of a radio terminal, its base unit body, and antenna device in embodiment 9 of the invention.

FIG. 20 is a perspective appearance view of a base unit body and an antenna device of a network connection device in embodiment 9 of the invention.

This embodiment is similar to embodiments 5 and 6, except that an antenna device 23 is disposed outside of the base unit body 2 to connect with the radio terminal 1.

That is, as shown in FIG. 20, the antenna device 23 having a cable 24 is disposed outside of the base unit body 2, and its place of installation is not specified. At a leading end 25 of the cable 24, there is a connector 26 to be connected to the radio terminal 1. The radio terminal 1 has an antenna connector 27 to be connected to this connector 26.

In this structure, the radio terminal 1 is connected and fixed to the base unit body 2, and the connector 26 is connected to the antenna connector 27 of the radio terminal 1. Thus, the antenna device 23 operates as the antenna of the radio terminal 1. When the antenna device 23 is electrically connected to the radio terminal 1, the electric circuit is composed so that the antenna 1*b* of the radio terminal 1 may not function.

According to the embodiment, since the antenna device 23 outside of the base unit body 2 is not required to be portable as compared with the radio terminal 1, an antenna of enhanced performance can be designed without any consideration given to its size. Therefore, the radio reaching distance is extended regardless of the design of the base unit body 2. Further, the antenna device 23 is connected to the radio terminal 1 connected and fixed to the base unit body 2 by the cable 24. Hence, regardless of the method or place of installation of the base unit body 2, the antenna device 23 can be installed freely. Thus, the layout is free whether the base unit body 2 is installed in a wall-mount, vertical, or horizontal position.

(Embodiment 10)

Figure 21:
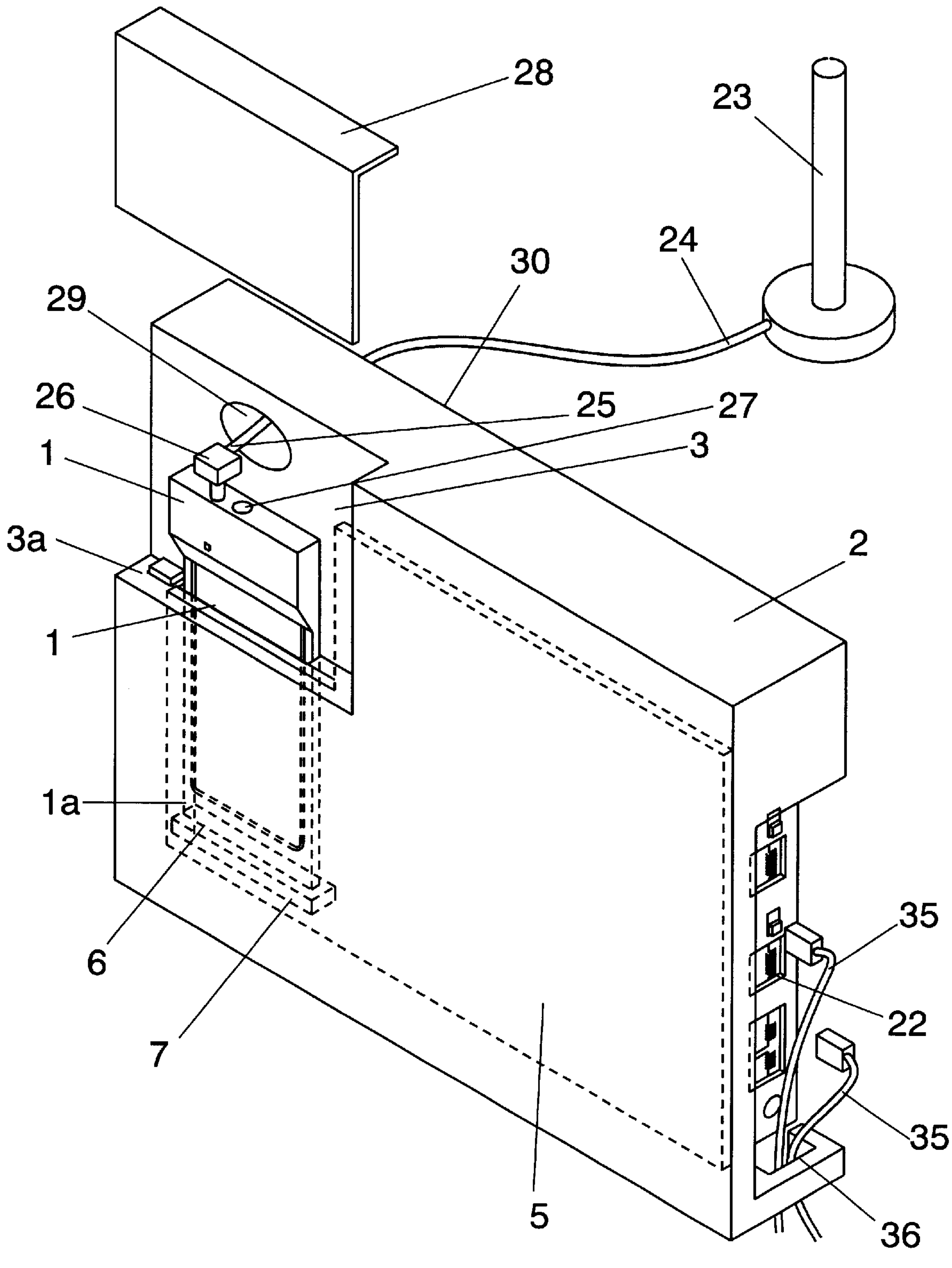
FIG. 21 is a perspective appearance view of a radio terminal, its base unit body, and antenna device in embodiment 10 of the invention.

FIG. 21 is a perspective appearance view of a base unit body and an antenna device of a network connection device in embodiment 10 of the invention.

This embodiment has the following features. In the foregoing embodiments 5 to 9, the printed circuit board 5 held in the base unit body 2 has the connector 7 disposed and mounted at a position for connecting and fixing to the base unit body without allowing the radio terminal 1 to project from the recess 3 in the base unit body 2. The recess 3 of the base unit body 2 is provided with a cover 28 serving as the surface of appearance of the base unit body by covering the radio terminal 1 and the recess 3 of the base unit body 2, and an opening 29 for wiring a cable 24 for connecting the antenna device 23 and the radio terminal 1.

That is, as shown in FIG. 21, the cover 28 with an L-shaped cross section is formed so as to cover the radio terminal 1 connected and fixed inside the recess 3 of the base unit body 2 and the recess 3. The recess 3 of the base unit body 2 has the opening 29 extending through to the back side 30 of the base unit body 2, at a position not to overlap when the radio terminal 1 is connected, fixed and stored. The size of the opening 29 is large enough for passing the cable 24 of the antenna device 23 and the connector 26 provided at the leading end 25 of the cable 24.

In this structure, with the radio terminal 1 connected and fixed in the recess 3 of the base unit body 2, the connector 26 at the leading end 25 of the cable 24 connected to the antenna device 23 is connected to the radio terminal 1 through the opening 29 formed in the recess 3 of the base unit body, and the cover 28 is fitted to the base unit body 2. Alternatively, connector 26 at the leading end 25 of the cable 24 is connected to the radio terminal 1, and the cable 24 passes through the opening 29 provided in the recess 3 of the base unit body 2, and is wired to outside at the back side 30 of the base unit body 2, and the cover 28 is fitted to the base unit body 2. Thus, the cover 28 may completely conceal the radio terminal 1 and the recess 3 of the base unit body 2. If not connected with the radio terminal 1, the cover 28 can conceal it. The fixing arrangement for fixing the cover 28 to the base unit body 2 is the same as that for fixing the lid 8 to the base unit body 2 in the foregoing embodiment.

Thus, since the recess 3 of the base unit body 2 is concealed by the cover 28, heat generation by operation of the radio terminal 1 is radiated into the cover 28 and the base unit body 2. Herein, the opening 29 provided in the recess 3 of the base unit body 2 released the radiation heat to outside of the base unit body 2.

According to the embodiment, since the cover 28 is provided, it prevents entry of foreign matter through the opening 4 in the base unit body 2 when connecting the radio terminal 1. At the same time, since the cover 28 conceals the radio terminal 1 and recess 3, the design of the base unit body 2 can be easily improved. The cable 24 does not project from the surface of the base unit body 2. By wiring the cable 24 to the antenna device 23 to outside of the backside 30 of the base unit body 2 through the opening 29, the design of the base unit body 2 is not sacrificed. The opening 29 releases heat generation of the radio terminal 1 to the outside, and eliminates effects of heat radiation into the base unit body 2.

(Embodiment 11)

Figure 22:
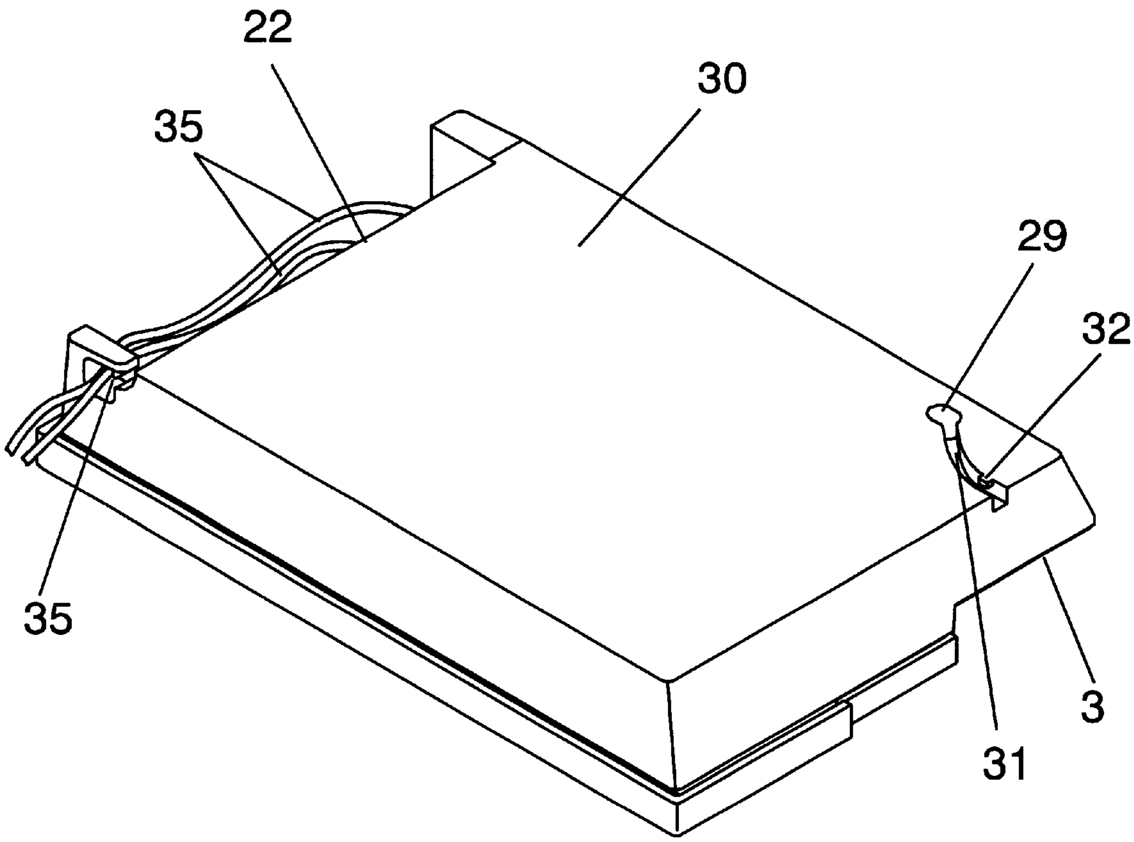
FIG. 22 is a perspective appearance view of a backside of a base unit body in embodiment 11 of the invention.

FIG. 22 is a perspective appearance view of a backside of a base unit body of a network connection device in embodiment 11 of the invention.

This embodiment is similar to embodiment 10, except that a groove 31 for wiring the cable 24 to the outside of the back side 30 of the base unit body 2 through the opening 29, and a bump 32 for clamping the cable 24 are provided at the back side 30 of the base unit body 2.

That is, as shown in FIG. 21 and FIG. 22, the recess 3 of the base unit body 2 is provided with an opening 29 to the back side 30 of the base unit body 2, at a position not to overlap when the radio terminal 1 is connected and fixed. Further, the back side 30 of the base unit body 2 is provided with a groove 31 communicating with the opening 29 and the end of the base unit body 2, being set larger than the diameter of the cable 24, and bumps 32 for clamping the cable 24. The number of bumps 32 for clamping is not particularly specified.

In this structure, the radio terminal 1 is connected and fixed to the base unit body 2, the connector 26 at the leading end 25 of the cable 24 connected to the antenna device 23 is connected to the connector 27 of the radio terminal 1 through the opening 29, and the cable 24 is wired to the outside of the base unit body 2 through the groove 31 at the back side 30 of the base unit body 2. The cable 24 is clamped by the bumps 32 provided in the groove 31 so that the cable 24 may not project from the groove 31. If the cable 24 can be separated between the antenna device 23 and the connector, to the contrary, the connector 26 may be first connected to the antenna connector 27, and then passed through the opening 29.

Further, by fitting the cover 28 to the base unit body 2, the cable 24 for connecting the radio terminal 1 and antenna device 23 can be hidden from the outside of the base unit body 2.

Thus, according to the embodiment, without allowing the cable 24 to project from the surface of the base unit body 2, the cable 24 to the antenna device 23 is wired to the outside of the base unit body 2 through the back side 30 of the base unit body 2 by way of the opening 29 and groove 31, and therefore the design of the base unit body 2 is not spoiled. When the base unit body 2 is installed in a wall-mount or horizontal position, the cable 24 settles between the wall, desk or floor and the base unit body, so that unstable installation of the base unit body 2 is prevented.

(Embodiment 12)

Figure 23:
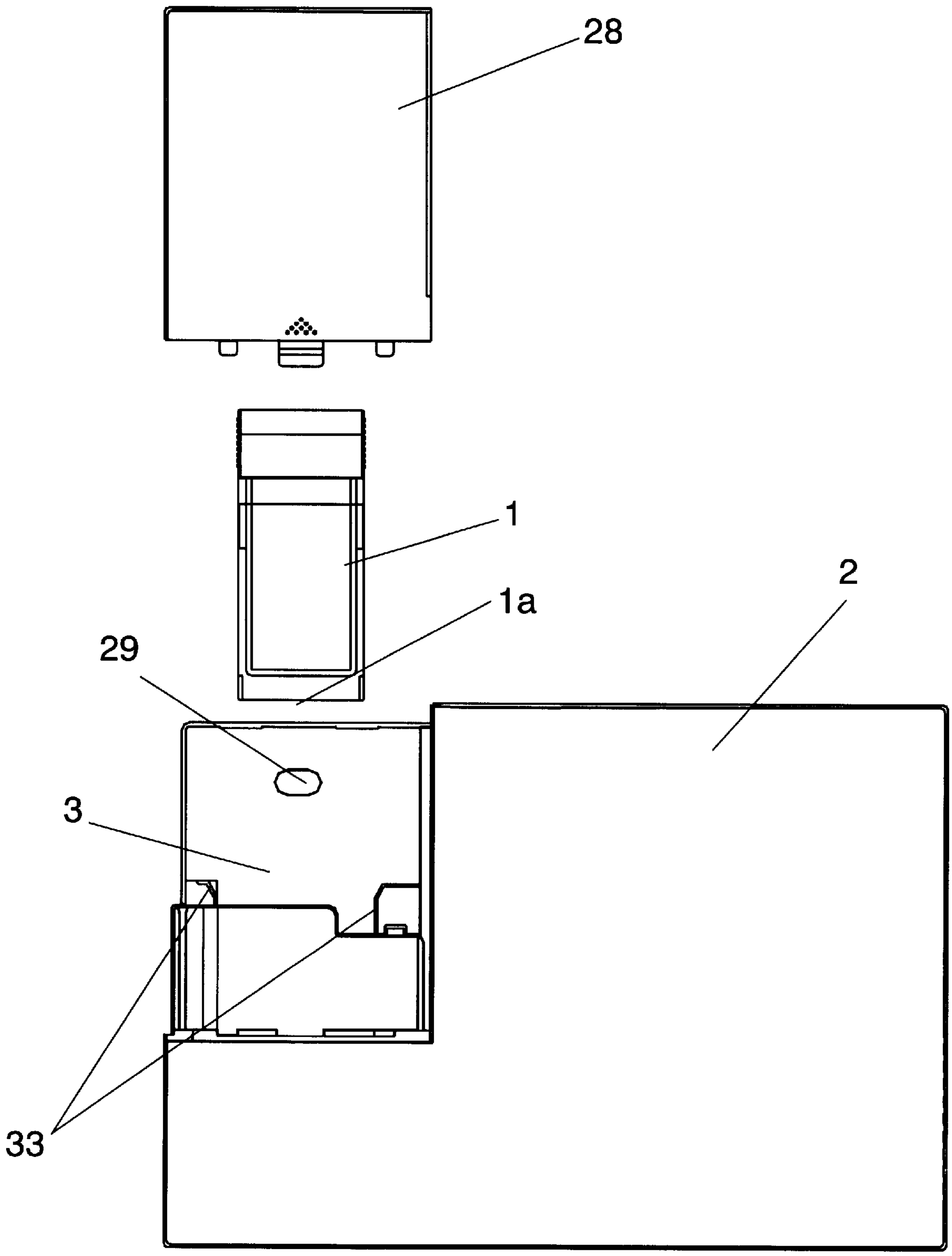
FIG. 23 is a front appearance view of a radio terminal and its base unit in embodiment 12 of the invention.

FIG. 23 is a front appearance view of a network connection device in embodiment 12 of the invention.

This embodiment is similar to the foregoing embodiments 5 to 8 and embodiment 10, except that a guide rib 33 is provided for the ease of insertion of the radio terminal 1 into the base unit body 2, when connecting and fixing the radio terminal 1 to the base unit body 2 through the opening 4 provided at the inner side 3*a* of the recess 3.

That is, as shown in FIG. 23, the recess 3 of the base unit body 2 is provided with a guide rib 33 into the opening 4 of the base unit body 2 which is used when inserting the radio terminal 1 into the base unit body.

In this structure, when connecting and fixing the radio terminal 1 to the base unit body 2, the radio terminal 1 is inserted along the guide rib 33 into the opening 4 provided at the inner side 3*a* of the recess 3 of the base unit body 2. Accordingly, the radio terminal 1 can be inserted along the guide rib 33 from any direction of the base unit body 2.

Thus, in the embodiment, since the guide rib 33 is provided in the recess 3 to be used when inserting the radio terminal 1 into the opening 4 at the inner side 3*a* of the recess 3 provided in the base unit body 2, the working efficiency is enhanced when inserting and connecting to the connector 7.

The guide rib 33 may be formed either at one side or both sides of the opening 4.

(Embodiment 13)

Figure 24:
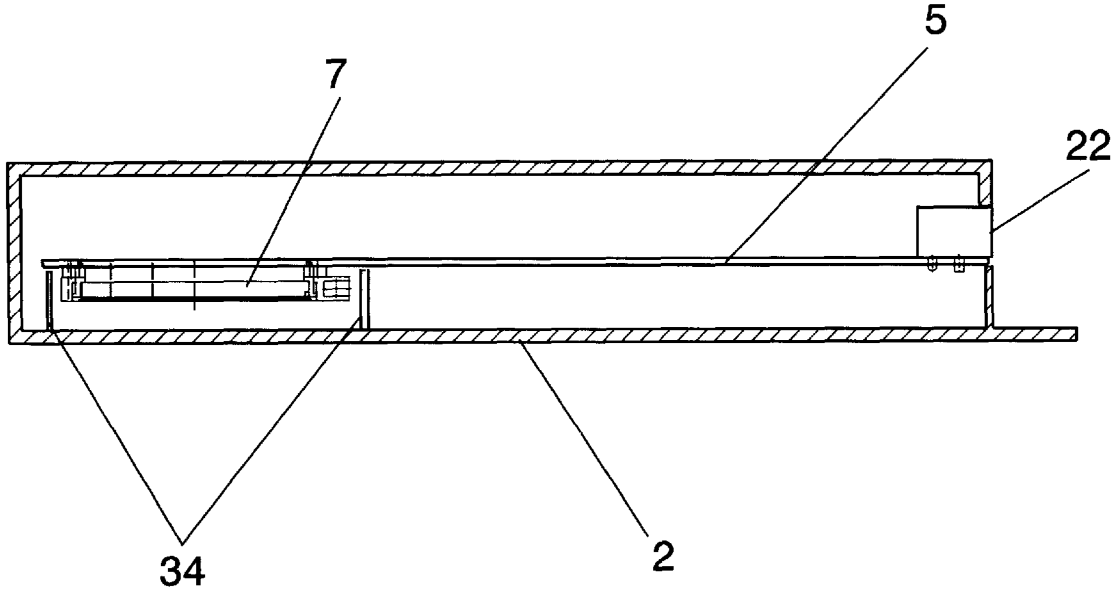
FIG. 24 is a cross sectional view of a radio terminal and its base unit in embodiment 13 of the invention.
Figure 25:
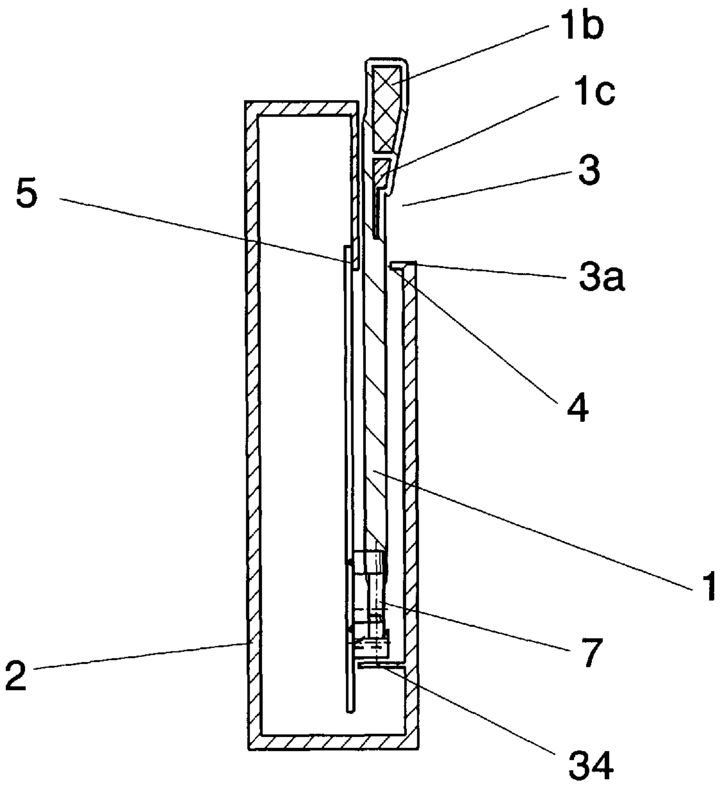
FIG. 25 is a longitudinal sectional view of the radio terminal and its base unit in embodiment 13 of the invention.

FIG. 24 is a cross sectional view of a network connection device in embodiment 13 of the invention, and FIG. 25 is a longitudinal sectional view of the network connection device.

This embodiment is similar to the foregoing embodiments 5 to 8 and embodiment 10, except that a rib 34 surrounding the periphery of the connector 7 on the printed circuit board 5 held in the base unit body 2 for connecting and fixing the radio terminal 1 is provided at the inside of the base unit body 2.

As shown in FIG. 24 and FIG. 25, when connecting and fixing the radio terminal 1 to the connector 7 mounted on the printed circuit board 5 in the base unit body 2, a rib 34 is provided in the direction of the printed circuit board 5 so as to surround the periphery of the connector 7 and the periphery of the radio terminal 1, from inside of the casing of the base unit body 2. The gap between the rib 34 and the printed circuit board 5 may be as narrow as possible, or they may contact with each other if permissible.

In such configuration, the radiation heat caused by operation of the radio terminal 1 stays within the space of installation of the radio terminal 1 in the base unit body 2 owing to this rib 34. Therefore, effects of radiation heat on other parts in the base unit body 2 can be lessened. It further contributes to prevention of entry of foreign matter into the base unit body 2 from the opening 4 when the radio terminal 1 is not connected, or the gap between the opening 4 and the radio terminal 1 when the radio terminal 1 is inserted.

(Embodiment 14)

This embodiment is similar to the foregoing embodiments 5 to 8 and embodiment 10, except that an opening 36 for inserting various cables 35 is provided at the end of a wired interface 22 provided at the end of the base unit body 2.

As shown in FIG. 21 and FIG. 22, interfaces 22 are concentrated on the end face confronting the connecting and fixing side of the radio terminal 1, and an opening 36 for inserting various cables 35 is provided at the side orthogonal to this end face. The shape of the opening 36 may be a completely closed opening shape. Or a part of the opening 36 may be released, or the released portion may be formed like a hinge.

In this structure, when inserting various cables 35 into the wired interfaces 22 concentrated at one end face of the base unit body 2, the cables 35 are inserted into the opening 36, and wired to outside of the base unit body 2.

Thus, according to the embodiment, the cables 35 can be clamped by the opening 36 without projecting from the surface of the base unit body 2. Therefore, the design of the base unit body 2 is not sacrificed, and whether the base unit body 2 is installed in a wall-mount, vertical or horizontal position, the cables 35 can be clamped securely. Thus, the cables 35 settle between the wall, desk or floor and the base unit body, so that unstable installation of the base unit body 2 can be prevented.

The foregoing embodiments may be changed or modified within the scope of the invention.

What is claimed is:

1. A radio terminal base unit capable of accommodating a radio terminal for making radio communications including voice, text and graphics data communications, comprising:

a base unit body having a recess formed at least over two substantially mutually orthogonal planes of said base unit body;

an opening peripheral part for forming an opening for inserting the radio terminal, in the bottom of said recess;

a connecting and fixing arrangement for connecting electrically with the radio terminal inserted from said opening by way of said recess, and fixing the radio terminal mechanically;

a lid for shielding said recess accommodating the radio terminal;

wherein said base unit body has an antenna with a wired cable having a terminal for electrically connecting to an external antenna terminal of the radio terminal; and wherein said lid has a terminal to be connected to said wired cable of said antenna at a position to correspond to the external antenna terminal of the radio terminal when said recess is shielded by said lid, and further connected to the external antenna terminal of the radio terminal.

2. The radio terminal base unit of claim 1, wherein said lid is disposed rotatably at the end of a slide member which slides to be drawn out from said recess, and when drawing out the stored radio terminal, after pulling out said slide member, said lid is rotated and the radio terminal is taken out.

3. A radio terminal base unit capable of accommodating a radio terminal having an antenna and a radio unit for making radio communications including voice, text and graphics data, comprising:

a base unit body having a recess formed at least over two substantially mutually orthogonal planes of said base unit body;

an opening peripheral part for forming an opening for inserting the radio terminal, in an inner side of said recess; and a printed circuit board having a connector for connecting with the radio terminal, being held in said base unit body;

wherein a portion of said printed circuit board arranged to overlap with the antenna of the radio terminal when the radio terminal inserted through said opening from said recess is electrically connected and fixed by said connector is either i) free from conductor parts such as power source layer, ground layer, and signal pattern, or ii) notched;

wherein an external antenna device is provided that is capable of connecting with an antenna terminal of the radio terminal connected and fixed electrically in said base unit body;

wherein a cover provided and serves as the surface of the appearance of said base unit body by covering the radio terminal accommodated in said recess; and wherein a hole penetrating through the back side of said base unit body is formed in said recess, and a cable for connecting the radio terminal accommodated in said recess and said antenna device is wired through this hole.

4. The radio terminal base unit of claim 3, further comprising a groove for wiring said cable penetrating through said opening to the end portion of said base unit body, being disposed at the back side of said base unit body.

5. The radio terminal base unit of claim 4, further comprising a bump for clamping the cable formed in a part of said groove.

6. The radio terminal base unit of claim 3, further comprising a rib used as a guide when inserting and connecting the radio terminal into said base unit body.

7. The radio terminal base unit of claim 3, further comprising a rib surrounding the periphery of said connector, being disposed in said base unit body.

8. A radio terminal base unit capable of accommodating a radio terminal having an antenna and a radio unit for making radio communications including voice, text and graphics data, comprising:

a base unit body having a recess formed at least over two substantially mutually orthogonal planes of said base unit body;

an opening peripheral part for forming an opening for inserting the radio terminal, in an inner side of said recess; and a printed circuit board having a connector for connecting with the radio terminal, being held in said base unit body;

wherein a portion of said printed circuit board arranged to overlap with the antenna of the radio terminal when the radio terminal inserted through said opening from said recess is electrically connected and fixed by said connector is either i) free from conductor parts such as power source layer, ground layer, and signal pattern, or ii) notched;

wherein said recess is formed over three substantially mutually orthogonal planes of said base unit body;

wherein an external antenna device is provided that is capable of connecting with an antenna terminal of the radio terminal connected and fixed electrically in said base unit body;

wherein a cover provided and serves as the surface of the appearance of said base unit body by covering the radio terminal accommodated in said recess; and wherein a hole penetrating through the back side of said base unit body is formed in said recess, and a cable for connecting said radio terminal accommodated in said recess and said antenna device is wired through this hole.

9. The radio terminal base unit of claim 8, wherein an interface unit for wired communication including voice, text and graphics data communications is disposed at an end face confronting at least one end of the three mutually substantially orthogonal planes for forming said recess.

10. The base unit of radio terminal of claim 9, further comprising an opening for clamping a cable, formed at an end having the wired interface of said base unit body.

11. The radio terminal base unit of claim 8, further comprising a groove for wiring said cable penetrating through said opening to the end portion of said base unit body, being disposed at the back side of said base unit body.

12. The radio terminal base unit of claim 11, further comprising a bump for clamping the cable formed in a part of said groove.

13. A radio terminal base unit capable of accommodating a radio terminal for making radio communications including voice, text and graphics data communications, comprising:

a base unit body having a front face, an upper face and a side face;

wherein said base unit body has a recess formed therein so as to open upward through said upper face;

wherein said recess is further formed in said base unit body so as to open at least one of forward through said front face and sideward through said side face, in order to allow for horizontal insertion of the radio terminal into said recess from outside said base unit body in an insertion direction;

wherein said base unit body includes an opening peripheral part formed at an inner side of said recess, and said opening peripheral part has an opening formed therein to allow for horizontal insertion in the insertion direction of a rear part of the radio terminal from said recess into an interior of said base unit body;

a connecting and fixing arrangement provided in said interior of said base unit body to electrically connect with, and mechanically secure, the radio terminal when the rear part of the radio terminal is inserted horizontally in the insertion direction through said opening of said opening peripheral part into said interior of said base unit body; and a lid provided on said recess to shield said recess when the radio terminal is accommodated in said recess.

14. The radio terminal base unit of claim 13, wherein said base unit body includes an antenna with a wired cable having a terminal for electrically connecting to an external antenna terminal of the radio terminal.

15. The radio terminal base unit of claim 14, wherein said lid has a terminal to be connected to said wired cable of said antenna and to the external antenna terminal of the radio terminal, when said recess is shielded by said lid.

16. The radio terminal base unit of claim 15, further comprising a slide member for holding the radio terminal, said slide member being slidably mounted to said base unit body to slidably move the radio terminal into and out of said recess and said opening; and wherein said lid is rotatably mounted to an end portion of said slide member.

17. The radio terminal base unit of claim 13, wherein said recess is formed in said base unit body so as to open both forward through said front face and sideward through said side face.

18. The radio terminal base unit of claim 13, further comprising a circuit board mounted in the interior of said base unit body, said circuit board being electrically connected to said connecting and fixing arrangement;

wherein said circuit board is arranged in said base unit body so that an overlap portion of an outer profile of said circuit board will overlap with an antenna of the radio terminal when the radio terminal is inserted into the opening and connected to said circuit board via said connecting and fixing arrangement; and wherein said overlap portion of said circuit board is either free from conductor parts or notched.

19. The radio terminal base unit of claim 13, wherein said recess, said opening in said opening peripheral part and an interior of said base unit body are arranged to receive a sufficient length of the radio terminal so that, when the radio terminal is inserted through said opening, said recess can accommodate the remainder of the length of the radio terminal, so the radio terminal is accommodated fully within said recess and the interior of said base unit body.

20. The radio terminal base unit of claim 19, wherein said lid is constructed to entirely cover said recess.

21. The radio terminal base unit of claim 13, wherein said lid is constructed to entirely cover said recess.

22. A radio terminal base unit capable of accommodating a radio terminal for making radio communications including voice, text and graphics data communications, comprising:

a base unit body having a front face, an upper face and a side face;

wherein said base unit body has a recess formed therein so as to open upward through said upper face;

wherein said recess is further formed in said base unit body so as to open at least one of forward through said front face and sideward through said side face, in order to allow for horizontal insertion of the radio terminal into said recess from outside said base unit body in an insertion direction;

wherein said base unit body includes an opening peripheral part formed at an inner side of said recess, and said opening peripheral part has an opening formed therein to allow for horizontal insertion in the insertion direction of a rear part of the radio terminal from said recess into an interior of said base unit body;

wherein a circuit board is mounted in the interior of said base unit body and includes a connector for connecting with the radio terminal;

wherein said circuit board is arranged in said base unit body so that an overlap portion of an outer profile of said circuit board will overlap with an antenna of the radio terminal when the radio terminal is inserted into the opening and connected to said connector; and wherein said overlap portion of said circuit board is either free from conductor parts or notched.

23. The radio terminal base unit of claim 22, wherein said recess is formed to open through three substantially mutually orthogonal faces of said base unit body.

24. The radio terminal base unit of claim 23, wherein an interface unit for wired communication is disposed at an end face opposite one of said three substantially mutually orthogonal faces of said base unit body.

25. The radio terminal base unit of claim 24, further comprising a cable-holding opening member provided at said end face at which said interfaced unit is disposed, for holding a cable leading to said interface unit.

26. The radio terminal base unit of claim 23, further comprising an external antenna device capable of connecting with an antenna terminal of the radio terminal when secured and connected electrically in said base unit body.

27. The radio terminal base unit of claim 26, further comprising a cover that covers the radio terminal when accommodated in said recess; and wherein a hole is formed through said base unit body into said recess, and a cable is extended through said hole for connecting the radio terminal accommodated in said recess and said antenna device.

28. The radio terminal base unit of claim 27, wherein a groove is formed at a back side of said base unit body and opens through an end portion of said base unit body, and said cable extended through said hole is extended through said groove.

29. The radio terminal base unit of claim 28, wherein a bump is formed protruding into said groove so as to clamp said cable in said groove.

30. The radio terminal base unit of claim 22, further comprising an external antenna device capable of connecting with an antenna terminal of the radio terminal when secured and connected electrically in said base unit body.

31. The radio terminal base unit of claim 30, further comprising a cover that covers the radio terminal when accommodated in said recess; and wherein a hole is formed through said base unit body into said recess, and a cable is extended through said hole for connecting the radio terminal accommodated in said recess and said antenna device.

32. The radio terminal base unit of claim 31, wherein a groove is formed at a back side of said base unit body and opens through an end portion of said base unit body, and said cable extended through said hole is extended through said groove.

33. The radio terminal base unit of claim 32, wherein a bump is formed protruding into said groove so as to clamp said cable in said groove.

34. The radio terminal base unit of claim 22, further comprising a rib for guiding the radio terminal into said base unit body.

35. The radio terminal base unit of claim 22, further comprising a rib disposed in an interior of said base unit body surrounding a periphery of said connector.

* * * * *